US008199107B2

(12) United States Patent
Xu et al.

(10) Patent No.: US 8,199,107 B2
(45) Date of Patent: Jun. 12, 2012

(54) INPUT INTERFACE DEVICE WITH TRANSFORMABLE FORM FACTOR

(75) Inventors: Rex Fang Xu, Waterloo (CA); Carolyn Gail MacGregor, Waterloo (CA)

(73) Assignee: University of Waterloo, Waterloo, Ontario (CA)

( * ) Notice: Subject to any disclaimer, the term of this patent is extended or adjusted under 35 U.S.C. 154(b) by 1037 days.

(21) Appl. No.: 11/722,553

(22) PCT Filed: Dec. 22, 2005

(86) PCT No.: PCT/CA2005/001954
§ 371 (c)(1),
(2), (4) Date: Mar. 12, 2008

(87) PCT Pub. No.: WO2006/066409
PCT Pub. Date: Jun. 29, 2006

(65) Prior Publication Data
US 2009/0040175 A1    Feb. 12, 2009

Related U.S. Application Data

(60) Provisional application No. 60/637,776, filed on Dec. 22, 2004.

(51) Int. Cl.
G06F 3/033 (2006.01)
G09G 5/08 (2006.01)
(52) U.S. Cl. ........................................... 345/158
(58) Field of Classification Search .............. 345/156, 345/161, 163–166; 178/18.01–19.07
See application file for complete search history.

(56) References Cited

U.S. PATENT DOCUMENTS

| 4,811,608 | A |   | 3/1989  | Hilton            |         |
|-----------|---|---|---------|-------------------|---------|
| 5,396,265 | A |   | 3/1995  | Ulrich et al.     |         |
| 5,666,473 | A |   | 9/1997  | Wallace           |         |
| 5,706,027 | A |   | 1/1998  | Hilton et al.     |         |
| 5,949,401 | A |   | 9/1999  | Kazarian          |         |
| 6,072,467 | A | * | 6/2000  | Walker            | 345/157 |
| 6,239,785 | B1|   | 5/2001  | Wallace et al.    |         |
| 6,246,390 | B1|   | 6/2001  | Rosenberg         |         |
| 6,580,420 | B1| * | 6/2003  | Wang              | 345/163 |
| 6,597,347 | B1|   | 7/2003  | Yasutake          |         |
| 6,642,927 | B1|   | 11/2003 | Balakrishnan et al.|        |
| 6,670,561 | B2| * | 12/2003 | Aoki              | 178/18.01 |

(Continued)

FOREIGN PATENT DOCUMENTS
WO    WO 01/69361 A2    9/2001

OTHER PUBLICATIONS

International Search Report and Written Opinion for corresponding international application PCT/CA2005/001954, date of mailing Apr. 12, 2006.

(Continued)

*Primary Examiner* — Bipin Shalwala
*Assistant Examiner* — Steven Holton
(74) *Attorney, Agent, or Firm* — Bereskin & Parr LLP

(57) ABSTRACT

Various implementations of an interface device, along with associated methods and systems, are described in which the interface device has a housing with a transformable form factor, and a transformation assembly that can change the form factor of the housing. At least one of the form factors of the housing has a shape that corresponds to data associated with the interface device.

27 Claims, 11 Drawing Sheets

U.S. PATENT DOCUMENTS

| | | | |
|---|---|---|---|
| 6,704,002 | B1 | 3/2004 | Martin et al. |
| 6,707,443 | B2 | 3/2004 | Bruneau et al. |
| 6,750,877 | B2 | 6/2004 | Rosenberg et al. |
| 6,760,006 | B2 | 7/2004 | Arita et al. |
| 6,781,569 | B1 | 8/2004 | Gregorio et al. |
| 6,781,576 | B2 | 8/2004 | Tamura |
| 7,209,116 | B2 * | 4/2007 | Gates et al. ............... 345/156 |
| 7,333,086 | B2 * | 2/2008 | Huang et al. ............... 345/156 |
| 2003/0038786 | A1 | 2/2003 | Nguyen et al. |
| 2003/0103041 | A1 | 6/2003 | Nguyen et al. |
| 2003/0214484 | A1 * | 11/2003 | Haywood ............... 345/163 |
| 2003/0222847 | A1 | 12/2003 | Nguyen et al. |
| 2004/0061682 | A1 | 4/2004 | Landfried |

OTHER PUBLICATIONS

International Preliminary Report on Patentability (IPRP) for corresponding international application PCT/CA2005/001954, date of mailing Jul. 5, 2007.

Webpage from www.globalhaptics.com/product.html Global Haptics—The Revolutionary Orb® Line, 2006.

What is Haptics? Webpage from http://www.handshakevr.com/section/view/?fnode=63, 2007.

R.F. Xu, veBall: a concept input device for virtual 3D manipulation, M.A.Sc. Thesis, 2004.

Hinckley, Ken et al., "Passive Real-World Interface Props for Neurosurgical Visualization", Human Factors in Computing Systems, CHI '94, Boston, Massachusetts USA, Apr. 24-28, 1994, pp. 452-453, 455-458.

Rekimoto et al., "ToolStone: Effective Use of the Physical Manipulation Vocabularies of Input Devices"—Sony Computer Science Laboratories, Inc., CHI Letters, vol. 2, 2. UIST, '00, San Diego, CA, USA © 2000, pp. 109-117.

Zhai, Shumin, "User Performance in Relation to 3D Input Device Design", IBM Almaden Research Center, Nov. 1998 Computer Graphics pp. 50-54.

Balakrishnan et al, "The Role of kinesthetic referene frames in two-handed input performance", In proceedings of the ACM UIST'99 Symposium, Asheville, N.C., pp. 171-178.

Buxton et al., A study in two-handed input, In proceedings of the SIGCHI conference on Human factors in computing systems, Apr. 13-17, 1999, Boston Massachusetts USA, pp. 321-326.

Cao et al., VisionWand: Interaction techniques for large displays using a passive wand tracked in 3D, In proceedings of the 16$^{th}$ Annual ACm symposium on User interface software and technology, Vancouver, Canada, Nov. 2-5, 2003., p. 729.

Cutler et al., Two-handed direct manipulation on the responsive workbench, In Proceedings of the 1997 symposium on Interactive 3D graphics, Providence, RI, pp. 107-114.

Frohlich et al., The Cubic mouse; a new device for three-dimensional input. In Proceedings of the SIGCHI conference on Human factors in computing systems, The Hague, Netherlands, Apr. 1-6, 2000, pp. 526-531.

Frohlich et al., Cubic-Mouse-Based Interaction in Virtual Environment, IEEE Computer Graphics and Application, 2000, pp. 12-15.

Goble et al., (2002) Two-Handed Spatial Interface Tools for Neurosurgical Planning, IEE Computer 28(7), pp. 20-26.

Grossman, T., et al., Interaction techniques for 3D modeling on large displays, In Proceedings of the 2001 symposium on Interactive 3D graphics, Mar. 2001, pp. 17-23.

Grossman et al., An interface for creating and manipulating curves using a high degree-of-freedom curve input device, In Proceedings of the SIGCHI conference on Human factors in computing systems, Apr. 5-10, 2003, Ft. Lauderdale, Florida, USA, pp. 185-192.

Guiard, Asymmetric division of labor in human skill bimanual action: The Kinematic Chain as a model. Journal of Motor Behavior, pp. 486-517, 1987.

Hinckley et al., Two-handed virtual manipulation, ACM Transactions on Computer-Human Interaction (TOCHI)., 5(3), pp. 260-302, 1998.

Hinckley et al., The VideoMouse: a camera-based multi-degree-of-freedom input device, In proceedings of the 12$^{th}$ annual ACM symposium on User interface software and technology, Nov. 7-10, 1999, (pp. 103-112), Asheville, North Carolina, United States.

Hinckley et al., Usability analysis of 3D rotation techniques, In proceedings of the 10$^{th}$ annual ACM symposium on User interface software and technology Oct. 14-17 (pp. 1-10), 1997, Banff, Alberta, Canada.

Jones, Three-dimensional input device with six degrees of freedom, Mechatronics, 9, pp. 717-729, 1999.

Kallman et al., Direct 3D interaction with smart objects. In proceedings of the ACM symposium on Virtual reality software and technology. London, UK, pp. 124-130, 1999.

Kuester et al., 3DIVS: 3-dimensional immersive virtual sculpting, In Workshop on New Paradigms in Information Visualization and Manipulation (NPIV '99), ACM Press, New York, New York, pp. 92-96, 1999.

Kuester et al., Interactive Two-handed terrain and set design in immersion environments. In Sato, M. and Hung Y-P (eds) The Tenth International Conference on Artificial Reality and Tele-existence (ICAT 2000) pp. 31-35, 2000.

Lalioti et al., Ndebele Painting in VR. IEEE Computer Graphics and Applications Journal Projects in VR.21(2), 10-13, 2001.

Lee et al., A Spatially-Aware Tangible Interface for Computer-Aided Design. In Proceedings of the SIGCHI Conference on Human Factors in Computing Systems, Apr. 5-10, 2003 (pp. 960-961), Ft. Lauderdale, Florida, USA.

Leganchuk et al., Manual and Cognitive Benefits of Two-Handed Input: An Experimental Study. ACM Transactions on Computer-Human Interaction, 5(4), pp. 326-359, 1998.

Maclean et al., Tagged Handles: Merging Discrete and Continuous Manual Control. In Proceedings of the SIGCHI Conference on Human Factors in Computing Systems, 2000 (pp. 225-232), The Hague, The Netherlands.

McLoone, Touchable objects: attributes applied to the design of the computer input devices. Ergonomics. 46(13-14), pp. 1320-1331, 2000.

O'Brien et al., Handbook of Human Factors Testing and Evaluation. Mahwah, NJ: Lawrence Erlbaum Associates, p. 193, 1996.

Paley, Designing Special-Purpose Input Devices. Computer Graphics 32(4), pp. 55-59, 1998.

Patten et al., Sensetable: A wireless Object Tracking Platform for Tangible User Interfaces. In Proceedings of the SIGCHI Conference on Human Factors in Computing Systems, Mar. 2001 (pp. 253-260), Seattle, Washington, USA.

Stefani et al., 3D input devices and interaction concepts for optical tracking in immersive environments. In Proceedings of the Workshop on Virtual environments, 2003 (pp. 317-318), Zurich, Switzerland.

Subramanian et al., Investigation of Subjective Preferences in Multiple Degrees-of-freedom Inputs. In Proceedings of the SIGCHI Conference on Human Factors in Computing Systems, Apr. 5-10, 2003 (pp. 934-935), Ft. Lauderdale, Florida, USA.

Easton et al., STEPS Statistics Glossary V1.1 Web version, revised and updated by Stuart G. Young (1997), (5 pages), www.stats.gla.ac.uk/steps/glossary/.

Ware et al., Rotating Virtual Objects with Real Handles. CM Transactions on Computer-Human Interaction. 6(2), pp. 162-180, 1999.

Welch et al., Motion Tracking: No Silver Bullet, but a Respectable Arsenal. IEEE Computer Graphics and Applications, 22(6), pp. 24-38, 2002.

Wesche, The ToolFinger: Supporting Complex Direct Manipulation in Vitual Environments. In Proceedings of the Workshop on Virtual Environments, 2003 (pp. 39-45) Zurich, Switzerland.

Wickens et al., Engineering Psychology and Human Performance. Prentice Hall, pp. 250-251, 2000.

Wilson et al., Pointing in Intelligent Environments with the WorldCursor, In INTERACT International Conference on Human-Computer Interactions, 2003 (pp. 39-45).

Wilson et al., XWand: UI for Intelligent Spaces. In Proceedings of the SGICHI Conference on Human Factors in Computing Systems, Apr. 5-10, 2003 (pp. 545-552), Ft. Lauderdale, Florida, USA.

Woods et al., MagicMouse: an Inexpensive 6-Degree-of0Freedom Mouse. In Proceedings of the 1$^{st}$ International Conference on Computer Graphics and Interactive Techniques in Australasia and South East Asia, 2003 (pp. 285-286), Melbourne, Australia.

Zhai et al., Anistropic human performance in six degree-of-freedom tracking: An evaluation of three-dimensional display and control interfaces, IEEE Transactions of Systems, Man, and Cybernetics—Part A: Systems and Humans. 27(4), pp. 518-528.
Inition Inc. Monkey 2, http://www.inition.co.uk/inition/product.php?RUL=product_mocaptrack_digitalimage_monkey&SubCatID_=51, (3 pages).
Immersion's Cyber Grasp—http://www.immersion.com/3d/products/cyber_grasp.php, 2008, (2 pages).
Immersion's CyberForce System for virtual prototyping—http://immersion.com/3d/products/haptic_workstation.php, 2008, (1 page).
Immersion's Micro Scribe G2, http://www.immersion.com/digitizer/products/microscribe_g2.php, 2008, (2 pages).
The Virtualhand SDK, http://www.immersion.com/3d/products/virtualhand_sdk.php, 2008, (2 pages).
PI Engineering, X-Keys Foot Pedal, http://www.piengineering.com/xkeys/xkfoot.phh and http://www.scanmagnetics.com/documents/xkeys_footpedal_brochure.pdf, 2007, (4 pages).
iReality.com Inc.—The 5DT Data Glove 16—http://ireality.com/p_glove16.html, (2 pages).
BioMuse- "Neural interface" http://www.biocontrol.com/, 2007, (5 pages).
The orbi Touch keyless ergonomic keyboard—http://www.keybowl.com, 2006, (1 page).
Cyber Force—http://www.immersion.com/3d/products/cyber_force.php, 2008, (1 page).
Cyber Touch—http://www.immersion.com/3d/products/cyber_touch.php, 2008, (1 page).
3D connexion SpaceMouse Classic—http://www.3dconnexion.com/3dmouse/overview.php, 2008, (1 page).
3D connexion SpaceBall 5000—http://inition.co.uk/inition/product.phh?URL_=products_3dinput_3dconnexion_spaceball&SubCatID_49, (2 pages).
Space Mouse Plus XT—3Dconnexion SpaceMouse Plus XT—3D motion controller, http://www.logicalplus.com/3dspmocose.html, 2003, (2 pages).
Connexion Cad Man—http://www.inition.co.uk/product.php?URL_=product_3dinput_3dconnexion_cadman&SubCatID_=49 and http://inition.co.uk/initon/pdf/3input_3dconnexion_cadman.pdf, 2003, (4 pages).
Cyber Glove—http://www.immersion.com/3d/products/cyber_glove.php, 2008, (2 pages).
3D Connexion Space Navigator—http://www.inition.co.uk/inition/product.php?URL_=product_3dinput_3dconnexion_spacenavigator&SubCatID_=49, (2 pages).
The P5 data glove, http://www.vrealities.com/P5.html, (3 pages).
Zhai, (1998), User Performance in Relation to 3D Input Device Design. Computer Graphics 32(4), Nov. 1998. pp. 50-54.(c) ACM, (8 pages).
Zhai et al., (1996), The influence of muscle groups on performance of multiple degree of freedom input control. Proceedings of CHI'96: ACM Conference of Human Factors in Computing Systems, (8 pages).
Fake Space Systems—v-wand—http://www.est-kl.com/hardware/accessories/fakespace/vwand.pdf, (1 page).
Frolich et al., (2000), The cubic mouse: a new device for three-dimensional input. In proceedings of the SIGCHI conference on Human factors in computing systems, Apr. 1-6, 2000, (pp. 526-531), The Hague, The Netherlands.
Fake Space Systems—Neowand—http://www.est-kl.com/hardware/accessories/fakespace/neowand.pdf, (1 page).
Pinch Gloves by FakeSpace Systems—http://www.mechdyne.com/integratedSolutions/displaySystems/pdf/Fakespace-Pinch.pdf, (1 page).
Fake Space Rave II—http://www.inition/product.php?URL_=product_largescreenvis_fakesapce_Rave_II&Sub.CatID_=39, (3 pages).
Paley, (1998), Designing Special-Purpose Input Devices. Computer Graphics, 32(4), pp. 55-59.
Novint Falcon game controller—http://home.novint.com/products/novint_falcon.php, (2 pages).
Logitech Airmouse—http://www.logitech.com/index.cfm/mice_pointers/mice/devices/3443&cl=us,en, 2008, (2 pages).
3D Connexion mouse family (Space Pilot, Space Explorer and Space Navigator)—http://www.3dconnexion.com/3dmouse/overview.php, 2008, (3 pages).
Humphreys, An Input Device for the Control of 3D Graphics, Final Report—Spring 2003, The University of Birmingham.
F7s Force Feedback Hand Controller—http://mpb-technologies.ca/mpbt/haptics/hand_controllers/scissors/description.html, 2007, (1 page).
Freedom Force Feedback Hand Controller—http://mpb-technologies.ca/mpbt/haptics/hand_controllers/freedom/description.html, 2007, (1 page).
Cubic Force Feedback Hand Controller—http://mpb-technologies.ca/mpbt/haptics/hand_controllers/cubic/cubic.html, 2007, (1 page).
Freedom Force Feedback Hand Controller Specification—http://mpb-technologies.ca/mpbt/haptics/hand_controllers/freedom/resources/6s-rev.2.pdf, (3 pages).
F7s Force Feedback Hand Controller Specification—http://mpb-technologies.ca/mpbt/haptics/hand_controllers/scissors/media/MPB-F6S.pdf, (3 pages).

\* cited by examiner

INPUT INTERFACE DEVICE WITH TRANSFORMABLE FORM FACTOR

REFERENCE TO RELATED APPLICATION

This application claims priority from U.S. Provisional Patent Application Ser. No. 60/637,776 filed on Dec. 22, 2004.

FIELD

Various interface devices are described herein that can be used in various input and output scenarios associated with a computer application or a robotic device.

BACKGROUND

With the advancement of 3D graphics and modeling technology, many engineering and design professionals have adopted 3D computer modeling applications, such as AutoCAD® and Solidworks®, as tools to increase productivity. However, traditional 2D input devices, such as a keyboard, a mouse, and the like, are not designed for manipulating data and objects in 3D space. Accordingly, users can find such 2D input devices cumbersome to work with.

Techniques have been developed to configure a 2D device to perform 3D tasks. For example, with the help of an onscreen interface, many 3D computer applications provide the user with a 3D rotation tool (or orbit tool). When selected, this tool allows the user to rotate a virtual model of an object by clicking and dragging the mouse on a 2D surface. Typically, the direction of the 3D rotation is determined by the combination of an anchor point location (the point at which the mouse button is pressed down) and the direction of the dragging movement. Accordingly, it is clear that rotating an object 360 degrees can be awkward to perform with a 2D input device.

A variety of special input devices have also been developed for 3D computer applications. However, user performance with such devices varies greatly across device designs and tasks. Some of these special input devices cannot provide the required range of motion and are cumbersome to work with.

SUMMARY OF THE INVENTION

Various implementations of an interface device, along with associated methods and systems, are described in which the interface device has a housing with a transformable form factor, and a transformation assembly that can change the form factor of the housing. At least one of the form factors of the housing has a shape that corresponds to data associated with the interface device.

In one aspect, an interface device for allowing a user to interact with a computer application is provided. The interface device comprises a housing having a transformable form factor; and, a transformation assembly coupled to the housing for transforming the form factor of the housing between more than one form factor, wherein at least one form factor of the housing has a shape corresponding to data associated with the interface device.

In at least some cases, wherein the interface device further comprises: at least one sensor coupled to the housing for providing movement data associated with the movement of the device; and, at least one actuation member coupled to the transformation assembly for initiating the transformation of the form factor of the housing when actuated by a user.

In at least some cases, the data associated with the interface device includes the movement data.

In at least some cases, the interface device further comprises a feedback module including at least two feedback elements, the at least two feedback elements being adapted to providing different feedback modality output signals to the user based on feedback data received by the interface device, wherein the data associated with the interface device includes the feedback data.

In at least some cases, the at least one form factor of the housing has a shape according to the type of movement data provided in an input mode.

In at least some cases, the at least one form factor of the housing includes a flat surface when the user moves the interface device along a flat surface to provide translational movement data.

In at least some cases, the at least one form factor of the housing includes a spherical surface when the user rotates the interface device to provide rotational movement data.

In at least some cases, the at least one form factor of the housing includes an ellipsoidal surface when the user rotates the interface device to provide rotational movement data.

In at least some cases, the at least one form factor of the housing includes a conical surface when the user rotates the interface device to provide rotational movement data.

In at least some cases, the at least one form factor of the housing includes a cylindrical surface when the user rotates the interface device to provide rotational movement data.

In at least some cases, the at least one form factor includes a pyramidal surface when the user rotates the interface device to provide rotational movement data.

In at least some cases, the interface device operates in first and second input modes, and wherein the housing has a corresponding first form factor when the interface device operates in the first input mode, and the housing has a corresponding second form factor when the interface device operates in the second input mode.

In at least some cases, the interface device operates in additional input modes, wherein for each of the additional input modes, the housing has a corresponding form factor.

In at least some cases, the interface device provides a first type of movement data when operating in the first input mode and a second different type of movement data when operating in the second input mode.

In at least some cases, wherein the interface device provides translational movement data in the first input mode and rotational movement data in the second input mode.

In at least some cases, the at least one sensor includes a three-dimensional tracker to track the rotation of the interface device to provide the rotational movement data.

In at least some cases, the interface device is useable in combination with an additional input device to provide the translational movement data, the interface device further comprising a two-dimensional marker and the additional input device tracks the movement of the two dimensional marker to generate the two-dimensional data.

In at least some cases, the interface device further comprises a two-dimensional tracker to track the translation of the interface device in relation to a flat surface to provide the translational movement data.

In at least some cases, when the user transforms the form factor of the housing, the interface device is adapted to automatically switch to a corresponding input mode.

In at least some cases, the interface device is further adapted to automatically enable the at least one sensor that provides movement data associated with the corresponding input mode.

In at least some cases, the housing has an additional form factor for which there is no corresponding input mode.

In at least some cases, the interface device provides can further provide additional types of data in addition to movement data.

In at least some cases, the at least one actuation member provides an output signal that can be used to provide additional functionality in the computer application.

In at least some cases, the housing comprises first and second housing portions, and the transformation assembly is adapted to move the first and second housing portions with respect to one another to transform the form factor of the housing.

In at least some cases, the first housing portion has a truncated sphere shape and the second housing portion has a bowl shape, and wherein the transformation assembly is adapted to move the second housing portion within the first housing portion to provide a truncated spherical form factor.

In at least some cases, the at least one actuation member includes second and third actuation members located along the surface of the housing, and when either is actuated initiates a transformation to provide a truncated spherical form factor.

In at least some cases, the second and third actuation members are curved rectangular buttons having a concave outer surface.

In at least some cases, the first housing portion has a truncated sphere shape and the second housing portion has a bowl shape, and wherein the transformation assembly is adapted to move the second housing portion downwards with respect to the first housing portion to provide a spherical form factor.

In at least some cases, the at least one actuation member includes a first actuation member located at an upper portion of the housing having a rod-like shape, and when actuated initiates a transformation to the spherical form factor.

In at least some cases, the feedback module includes a light source for emitting light when the interface device is operating in a particular input mode.

In at least some cases, the feedback module includes a light source adapted to emit light when the interface device transitions between different input modes.

In at least some cases, the feedback module includes a light source adapted to provide the user with visual feedback to simulate interaction with a virtual object provided by the computer application.

In at least some cases, the feedback module includes a force-feedback element adapted to provide the user with tactile feedback to simulate interaction with a virtual object provided by the computer application.

In at least some cases, the feedback module includes a sound emitting device to provide the user with auditory feedback to emphasize an event occurring in the computer application.

In at least some cases, the interface device further comprises: at least one switch associated with the at least one actuation member to generate at least one actuation signal when the at least one actuation member is actuated; and, a wireless unit connected to the at least one switch and the at least one sensor to receive the at least one actuation signal and the movement data, respectively, the wireless unit being adapted to wirelessly transmit wireless data based on the movement data and the at least one actuation signal.

In at least some cases, the interface device further comprises: at least one switch associated with the at least one actuation member to generate at least one actuation signal when the at least one actuation member is actuated; and, a connector port connected to the at least one switch and the at least one sensor to receive the at least one actuation signal and movement data, respectively, the connector port being adapted to connect to a corresponding port on a computing device to provide the movement data and the least one actuation signal.

In another aspect a system is provided. The system comprises: a host computer; a display connected to the host computer; a computer application being executed on the host computer; and, an interface device connected to the host computer to allow a user to interact with the computer application, the interface device having a housing with a transformable form factor.

In at least some cases, the housing transforms between more than one form factor, the form factor corresponding to input data provided by the interface device to the computer application.

In at least some cases, the housing transforms between more than one form factor, the form factor corresponding to feedback data provided to the interface device from the computer application.

In at least some cases, the computer application provides a computer generated representation of an object, and the user operates the interface device in a first input mode with a first form factor to provide translational movement data associated the movement of the interface device, the first form factor allowing the user to move the interface device with up to two degrees of freedom for translational manipulation of the object.

In at least some cases, the interface device further comprises a two dimensional tracker that provides the translational movement data.

In at least some cases, the system further comprises a graphical input tablet and the interface device comprises a two dimensional marker, wherein the graphical input tablet tracks the movement of the interface device based on the two dimensional marker to provide the translational movement data.

In at least some cases, the user operates the interface device in a second input mode with a second form factor to provide rotational movement data associated the movement of the interface device, the second form factor allowing the user to move the interface device with a minimum of three and a maximum of six degrees of freedom for orientational manipulation of the object, wherein interface device further comprises a three dimensional tracker to provide the rotational movement data.

In at least some cases, the system is a robotic system.

In another aspect, an input device is provided. The input device comprises a housing having a transformable form factor; at least one sensor coupled to the housing for providing movement data related to the movement of the input device; a transformation assembly coupled to the housing for transforming the form factor of the housing between more than one form factor; and, at least one actuation member coupled to the transformation assembly for initiating the transformation of the form factor of the housing when actuated by a user, wherein, the shape of the form factor of the housing corresponds to a type of movement data provided in a given input mode.

BRIEF DESCRIPTION OF THE DRAWINGS

For a better understanding of the various devices, methods and systems described herein, and to show more clearly how they may be carried into effect, reference will now be made, by way of example only, to the accompanying drawings in which:

FIG. 2b is a fully exploded view corresponding to FIG. 2a;

FIGS. 3c-3f are illustrations of a user using the input device of FIGS. 1a and 1b in the exemplary system of FIG. 3a;

FIGS. 4b-4e are illustrations of a user using the input device of FIG. 4a;

DETAILED DESCRIPTION

Figure 1A:
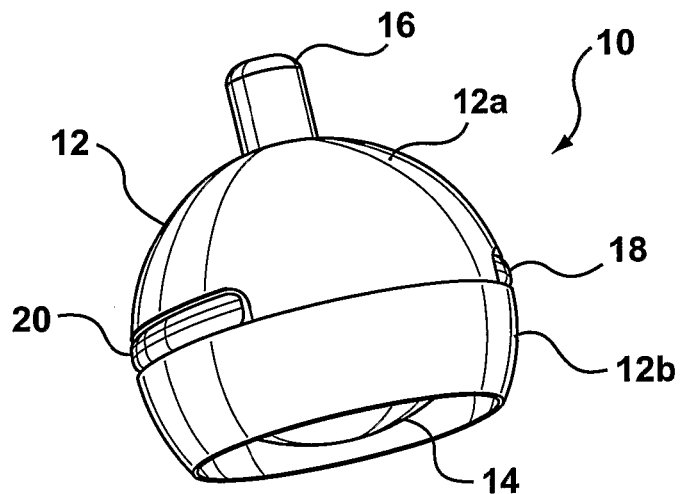
FIG. 1a is an illustration of an exemplary input device having a first form factor for operating in a first input mode.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements. In addition, numerous specific details are set forth in order to provide adequate understanding for practicing the various devices, methods or systems described herein. However, it will be understood by those of ordinary skill in the art that the various devices, methods or systems may be practiced without these specific details. In other instances, some methods, procedures and components have not been described in detail since they are well known to those skilled in the art.

Various implementations for an interface device, and associated methods and systems are provided herein. In general, the interface device includes a housing and a transformation assembly. The housing has a transformable form factor, and the transformation assembly can change the form factor of the housing. At least one of the form factors of the housing has a shape that corresponds to data associated with the interface device. In some implementations, the interface device can be used as an input device. In some implementations, the interface device can be used as an output device. In some implementations, the interface device can be used as an input/output device.

The interface devices described herein allow a user to interact with a computer application or a robotic device. In some instances, the user can use the interface device to provide two and/or three-dimensional input data to the computer application or robotic device. In other instances, the user can use the interface device to receive feedback data from the computer application or the robotic device. In other instances, the user can use the interface device to provide input data and receive feedback data. Accordingly, for the various implementations of the interface device described herein, the data associated with the interface device can be movement data, feedback data or both movement data and feedback data.

Various implementations for interface devices will now be described. In some cases the interface device is implemented as an input device and is referred to as an input device. In other cases the interface device is implemented as an input/output device but will be referred to as an interface device. In other instances, the interface device is implemented as an output device and is referred to as an output device. Accordingly, it should be understood that the term interface device generically refers to input devices, input/output devices and output devices having a transformable form factor.

Various devices, methods and systems are described herein for allowing a user to provide 2D and/or 3D input data to a computer application. The input device includes a transformation assembly that can transform the form factor of the input device depending on input data associated with the device which depends on the input mode of operation of the input device. Accordingly, when the input device has a certain form factor (i.e. outer physical configuration), the user knows that the input device is operating in a corresponding input mode that is capable of providing a certain type of input data. Further, when the user needs to provide a different type of input data, the user can transform the input device into another form factor for which the corresponding input mode provides the desired type of input data.

In at least some cases, the form factors of the input device can be selected such that it is easier for the user to manipulate the input device to provide a certain type of input data. Furthermore, in at least some cases, the form factors of the input device can be selected such that the user only requires one hand to manipulate the input device. This leaves the other hand free to perform other functions, if needed. In addition, in at least some cases, the form factor of the input device can be selected such that the user can use their left or right hand when manipulating the input device.

Figure 1B:
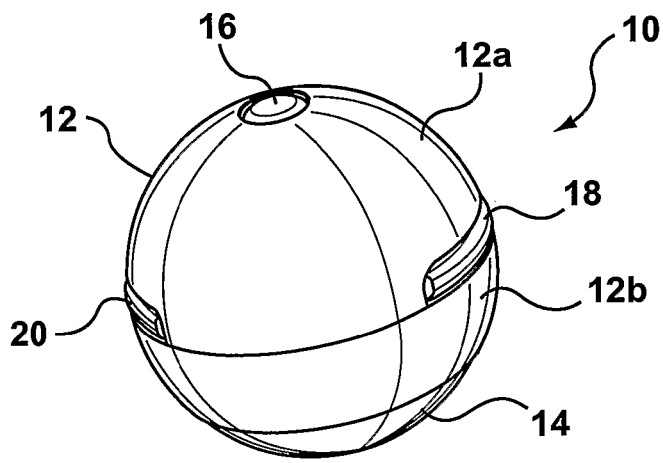
FIG. 1b is an illustration of an exemplary input device having a second form factor for operating in a second input mode.

Referring now to FIGS. 1 and 2, shown therein is an exemplary input device 10 having a transformable form factor for operating in various input modes. FIG. 1a shows the input device 10 having a first form factor corresponding to a first input mode and FIG. 1b shows the input device 10 having a second form factor corresponding to a second input mode.

The input device 10 includes a first housing portion 12, a second housing portion 14, and actuation members 16, 18 and 20. The input device 10 also includes a transformation assembly comprising several elements that are shown in more detail in FIGS. 2a-2d. In this implementation, actuation member 16 is a rod while actuation members 18 and 20 are slide switches, however, other suitable types of actuation members can be used in alternative implementations. Generally speaking, one of the housing portions moves with respect to the other housing portion when the form factor of the input device 10 is transformed. In this case, the second housing portion 14 moves with respect to the first housing portion 12. Further, the actuation members 16, 18 and 20 can be used to change the form factor and the input mode for the input device 10.

The first form factor is a truncated sphere in which the second housing portion 14 is moved upwards to expose a rim 24 with flat edges. This allows the input device 10 to be used on a flat surface in which the user can move the input device 10 to provide 2D data. This reduces user fatigue since the user can support their upper limbs on the same surface or a nearby surface. If an x-y coordinate system is introduced, the user can move the input device 10 along an x direction, a y direction or a combination of x and y directions. This input mode can be referred to as a translational input mode. A 2D tracker 110 (see FIGS. 2c and 2d) can be used to provide the required 2D data. In some implementations, the 2D position tracking of the input device 10 can start automatically as soon as the input device 10 is within a certain proximity of a desktop surface.

Various different types of 2D tracking techniques can be used. For instance, the 2D tracker 110 can be implemented by an optical tracker similar to those found in optical computer mice as is commonly known to those skilled in the art. Alternatively, there can be some implementations in which the input device 10 does not include a 2D tracker 110. For instance, the input device 10 can be used in combination with an additional input device, such as a graphical input tablet associated with a computer-modeling program, or by an alternative suitable means. The 2D movement of the input device 10 can then be tracked by the graphical input tablet. In these cases, the input device 10 further includes a 2D marker, that can be coupled to the housing 12 of the input device 10, and the movement of the 2D marker can be tracked by the graphical input tablet. For example, there can be some implementations in which the 2D marker includes a magnetic coil within input device 10, the position of which is tracked by the graphical input tablet. The graphical input tablet then generates 2D position information for the 2D marker and sends the 2D position information to the host computer via a serial or USB connection, for example.

In some implementations, the input device 10 can include a wireless unit, which can be based on Bluetooth technology, for example, for transmitting the 2D data to a host computer. In other implementations, the input device 10 can have a cable with a connector that connects to a corresponding data port on the host computer to transmit the 2D data.

The provision of 2D data while the input device 10 is operating in the first input mode allows the input device 10 to be used in a similar fashion as a conventional mouse. Accordingly, the user can intuitively recognize that the input device 10 can operate somewhat similarly to a mouse in this input mode. Further, this functionality also allows the input device 10 to be used in conjunction with 3D computer modeling programs that incorporate a graphical input tablet, which is described in more detail below.

When the input device 10 has this first form factor, the user knows that the input device 10 can provide 2D data. However, in some implementations, when the input device 10 has this first form factor, the input device 10 can also provide other information or functionality. The user can use the actuation members 18 and 20 to access this additional functionality, as will be described in more detail below.

When the input device 10 has the first form factor, and the user wishes to operate the input device 10 in another input mode, the user can actuate the actuation member 16. In this exemplary implementation, the user can press down on the actuation member 16, which moves the second housing portion 14 downwards with respect to the first housing portion 12, so that the form factor of the input device 10 becomes a sphere and the input device 10 operates in a different input mode. The user can now use the input device 10 to provide different input data.

In this exemplary case, in the second input mode, the user can use the input device 10 to provide 3D rotation data. Accordingly, this input mode can be referred to as a rotational input mode. The input device 10 includes a 3D orientation tracker 112 (see FIGS. 2c and 2d) to track the movement of the input device 10. In general, the 3D tracker 112 can be an inertial, mechanical, acoustic, magnetic, or an optical tracker that provides sufficiently accurate data and is suitable for tracking the three dimensional movement of the input device 10 for the applications in which the input device 10 is used.

In some implementations, a wired FASTRAK tracking system developed by Polhemus® of Cochester, Vt., U.S.A. can be used to provide rotation data in 3 Degrees Of Freedom (DOF) (i.e. Yaw, Pitch and Roll). The FASTRACK tracking system can provide 6 DOF but since data for only 3 DOF is required, the full position-tracking capability of this tracker can be disabled. However, in other implementations, the full 6 DOF can be used. Alternatively, in other implementations, an InertiaCube2 unit made by InterSense® of Bedford, Mass., U.S.A., can be used to provide rotation data. Both of these trackers are small enough to fit within the input device 10. The InertiaCube2 also has the beneficial features of sourceless tracking in 3 DOF (i.e. single unit, no transmitters and receivers required), a fast update rate, and low cost. Both of these trackers currently require a wired connection to provide 3D input data to a host computer. In other implementations, a wireless tracking unit, which can be based on Bluetooth technology, for example, can be used to provide the rotation data to allow for completely unencumbered rotation of the input device 10. Further, in wireless versions, an InertiaCube3® unit made by InterSense can be used to implement a wireless three dimensional tracker.

Advantageously, the spherical form factor of the input device 10 in the second input mode closely corresponds to 3D rotation space. In addition, in the second input mode, the user can use finger manipulation to manipulate the input device 10, which provides more accurate control than would otherwise be possible if the input device 10 had another form factor which would require other grips such as the power grip achieved with the palm of the user's hand. Fingers also have higher dexterity than the wrist joint and the elbow joint so the user will find it easy to manipulate the input device 10 in the second input mode.

When the user wishes to switch the form factor of the input device 10 from the second form factor to the first form factor, the user can actuate either of the actuation members 18 and 20. This releases a locking mechanism, which causes the actuation member 16 and the second housing portion 14 to move upwards with respect to the first housing portion 12. The input mode also automatically switches from the second input mode to the first input mode.

Advantageously, for implementations with automatic input mode switching, the transformation of the input device 10 between the various form factors reinforces the functional change in input mode change, so that the user is always aware of the current input mode of the input device 10. This is achieved by integrating the transforming action with input mode switching; as a result the user can perform both physical form change and functional change with one action. For example, when the user actuates the actuation member 16 and transforms the form factor of the input device 10 to the spherical shape, the 3D orientation tracking can be enabled at the same time.

In some cases, the input device 10 can also provide feedback to the user to indicate that the 3D orientation tracker has been successfully enabled. For instance, in some implementations, the input device 10 can include a light source (not shown) that emits light when the 3D orientation tracker has been successfully enabled. The light source can be an LED, an EL display and the like. In some of these cases, the light source can be integrated into part of the housing of the input device 10. Alternatively, in some of these cases, the housing of the input device 10 can be transparent or semi-transparent and the light source can be contained within the housing of the input device 10. Further, in these cases, when the user actuates one of the actuation members 18 and 20, the form factor of the input device 10 switches back to truncated sphere, and the light source can turn off at the same time. Alternatively, in some implementations, the light source can turn on for a short time when the form factor of the input device 10 transforms into either the first and second form factors and the appropriate orientation tracker is enabled.

In some cases, the input device 10 can operate as an input/output device and include a mechanism or feedback element to provide haptic feedback to the user to indicate that a function has been enabled or an event has occurred. For example, in some implementations, the input device 10 can include a vibrating element (not shown) to provide a mechanical vibration to indicate that the 3D orientation tracker 112 has been successfully enabled. Alternatively, in some implementations, the input device 10 can 10 include an additional transformation element (not shown) that can expand and contract the housing of the input device 10 as haptic feedback to notify the user that a function has been successfully enabled.

In this exemplary implementation of the input device 10, the actuation members 18 and 20 can be side buttons that are long and curve around the sides of the input device 10. This allows the user to reach at least one of the two side buttons at all times. Since the side buttons must not be accidentally triggered when the input device 10 is providing 3D rotation data, in some implementations the side buttons can be slightly concave and the outer edges of the buttons can be aligned with the spherical surface of the input device 10. This prevents the side buttons from being pressed accidentally when the user is holding the input device 10 in one of their hands, yet it allows the user to easily locate the side buttons by touch and push at least one of the side buttons with a finger tip. In some implementations, the side buttons can also be spring-loaded so that a certain amount of force is required to actuate the side buttons to trigger a change in the form factor and input mode. In some implementations, rather than using side buttons, a flexible ring button at the equator of the input device can be used. The user can then push at any point along the ring button to trigger a change in the form factor and the input mode.

In some implementations, the feedback of the actuation members 18 and 20 can be similar to that of a mouse click. Accordingly, the user can feel and hear the click of the actuation members 18 and 20 when the user pushes one of them. This reassures the user that the appropriate action has been taken. Besides the tactile and auditory feedback, as mentioned, the input device 10 can include a light source that can be turned on or off when one of the actuation members 18 and 20 is pushed and the form factor of the input device 10 transforms to the first form factor. Accordingly, the light source can be an additional indicator of the current functional mode of the input device 10, which can be observed by the user's peripheral vision.

In general, in some implementations, the size of the input device can be selected such that the input device 10 can be easily manipulated with one hand. For instance, in one exemplary implementation, the overall diameter of the input device 10 can be about 6.8 cm while the form factor is spherical. This is beneficial since spherical sizes in this range are better for finger manipulation. However, other sizes can be chosen for the input device 10 based on the particular application with which the input device is used. For instance, the input device 10 can have a different size for educational and rehabilitation applications, which are described in more detail further below.

Figure 2A:
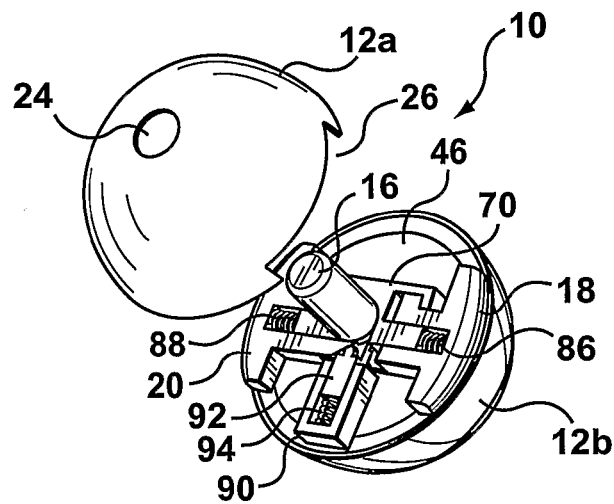
FIG. 2a is a partial exploded view of an exemplary implementation of the input device.
Figure 2B:
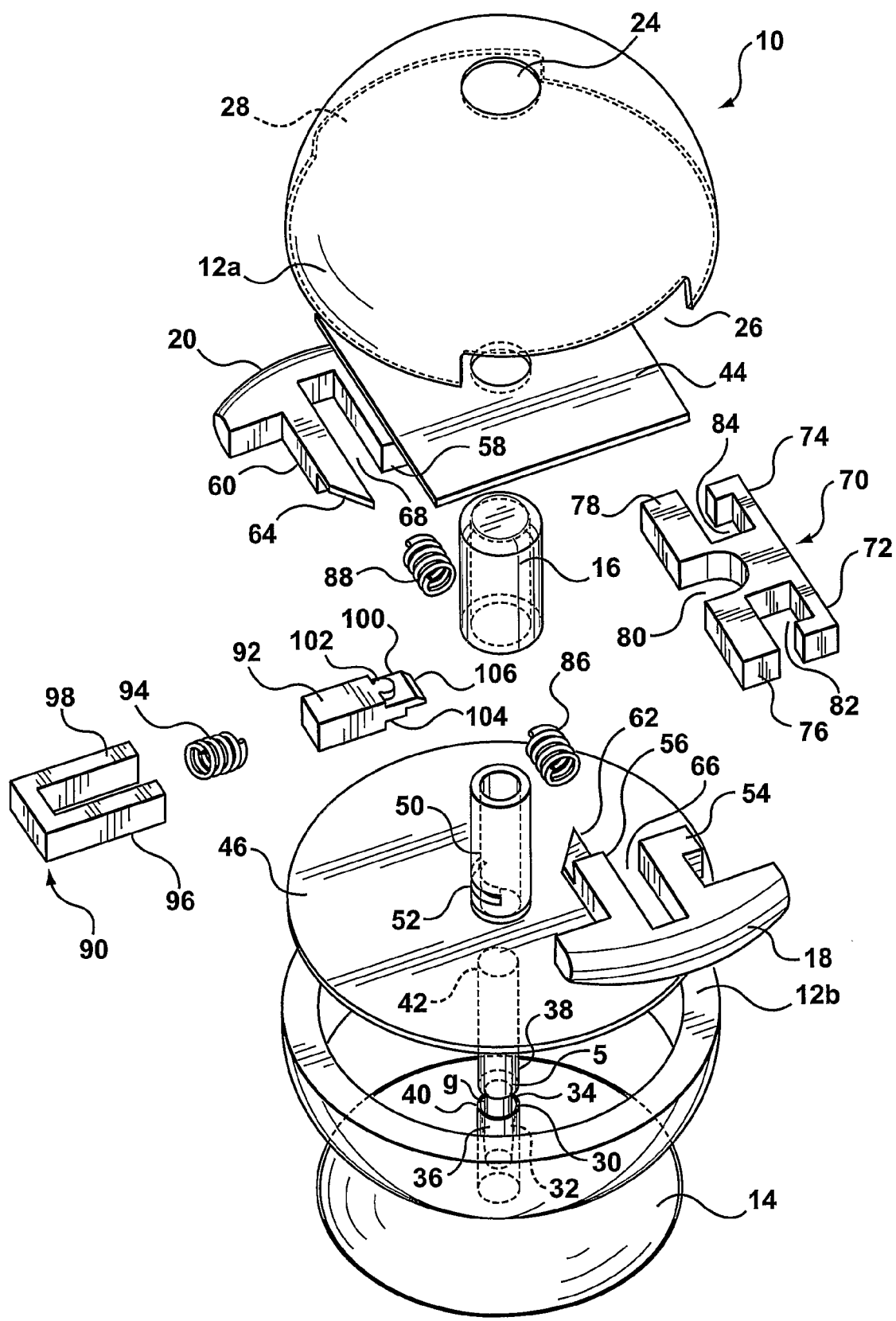
Figure 2C:
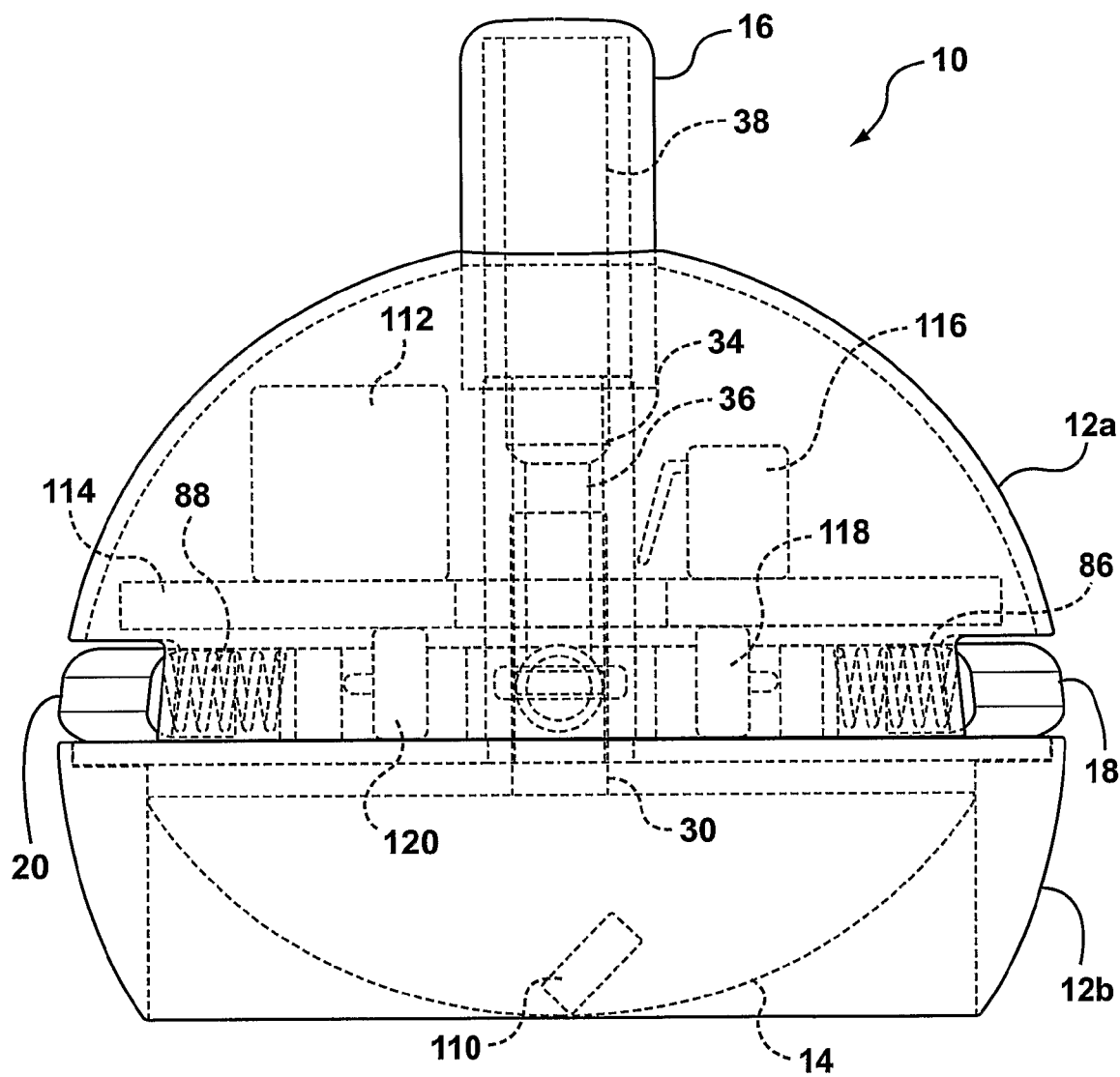
FIG. 2c is a cross-sectional side view of the exemplary implementation of the input device of FIGS. 2a and 2b when operating in the first input mode.
Figure 2D:
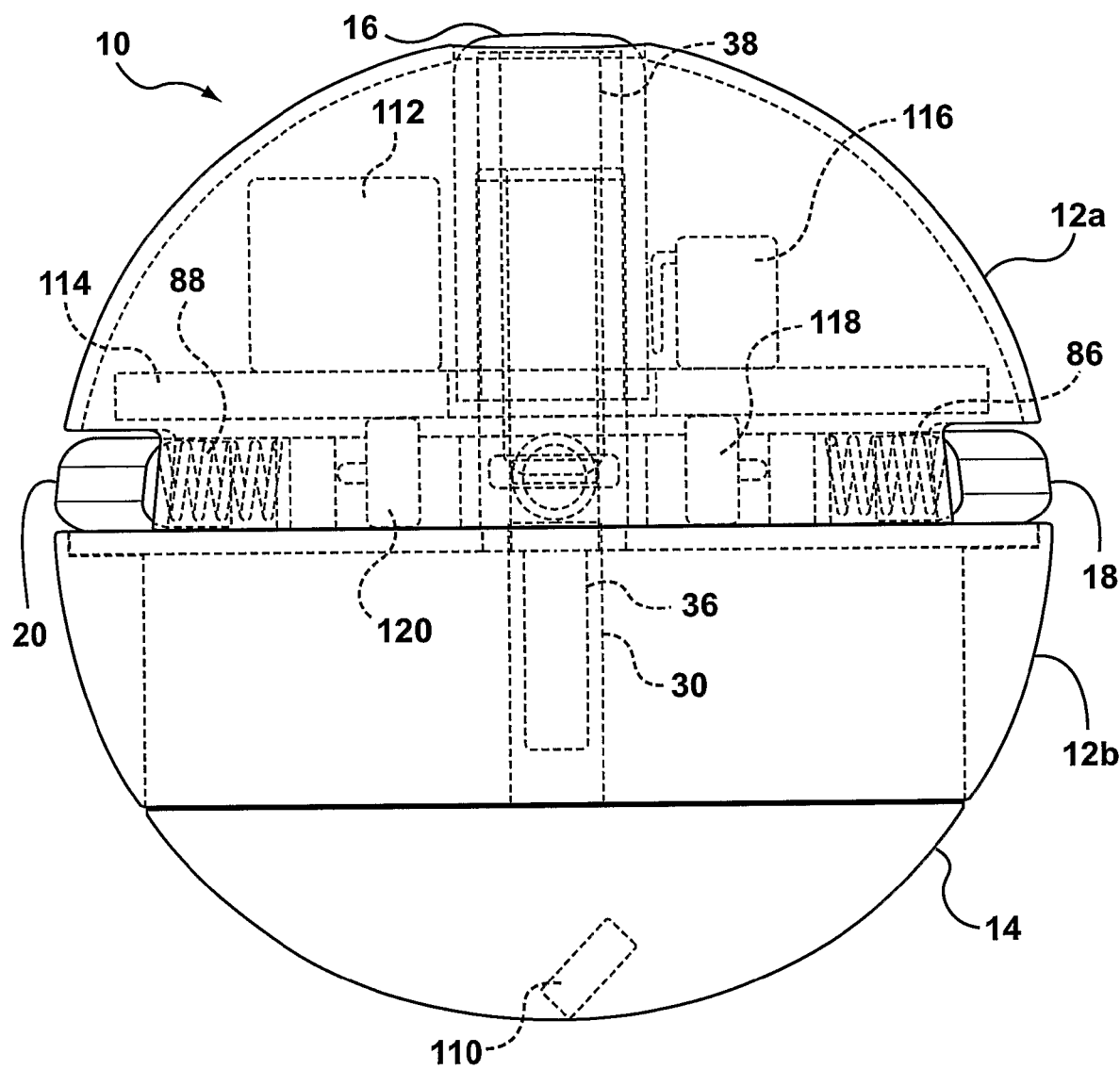
FIG. 2d is a cross-sectional side view of the exemplary implementation of the input device of FIGS. 2a and 2b when operating in the second input mode.

Referring now to FIGS. 2*a*-2*b*, shown therein are partial and fully exploded views of an exemplary implementation of the mechanical components of the input device 10 (electrical components are shown in FIGS. 2*c*-2*d*). It should be noted that various portions of the elements in FIG. 2*a* have not been labeled so as not to clutter the Figure.

Generally, in this exemplary implementation, the mechanical components of the input device 10 can be made from plastic. The first housing portion 12*a* of the input device 10 includes an upper hemispherical shell 12*a* with an aperture 24, and cutout portions 26 and 28, shaped slightly larger and in a complimentary fashion to the actuation members 16, 18, and 20, respectively. The first housing portion 12*a* also include a lower truncated hemispherical shell 12*b* in which the bottom portion has been truncated.

The second housing portion 14 includes a bowl-shaped shell having a centrally disposed connector 30 with a channel 32. A peg 34 having a narrow portion 36 and a wider portion 38 joined by a shoulder portion s slidably engages the channel 32 of the connector 30 such that the narrow portion 36 forms a friction fit with the channel 32. The friction fit between the peg 34 and the connector 30 leaves a gap g between the wider portion 38 of the peg 34 and a top surface 40 of the connector 30. The gap g exposes part of the narrow portion 36 of the peg 34 that can be engaged by a locking mechanism, which is explained in more detail below, to ensure that the form factor of the input device 10 is a truncated sphere. The other end 42 of the peg 34 slidably engages the actuation member 16, which as in this case, can be a hollow cylindrical cap with one closed end. In alternative implementations, the peg 34 can be formed integrally with the connector 30 and the second housing portion 14.

The combination of the actuation member 16, the peg 34 and the connector 30 provide a push button action. When the user presses down on the actuation member 16, the peg 34 and the connector 30, along the second housing portion 14, move downwards relative to the first housing portion 12 so that the form factor of the input device 10 becomes a sphere. These elements are held into place by the locking mechanism, which engages part of the wide portion 38 of the peg 34. When the user actuates one of the actuation members 18 and 20, the locking mechanism is released and the actuation member 16 along with the peg 34, the connector 30 and the second housing portion 14 move upwards with respect to the housing portion 14 so that the form factor of the input device 10 becomes a truncated sphere. At this point the locking mechanism engages part of the narrow portion 36 of the peg 34 at the gap g between the wider portion 38 of the peg 34 and the connector 30.

The input device 10 also includes first and second dividing plates 44 and 46, which hold the actuation members 18 and 20 and associated mechanical elements in place. The first dividing plate 44 can be a square or circular plate that includes an aperture 48, which is large enough to slidably receive the actuation member 16. The second dividing plate 46 includes an integral tube 50 having a slot 52 that is engaged by the locking mechanism. The diameter of the wider portion 38 of the peg 34 is smaller than the inner diameter of the tube 50 such that the peg 34 slidably engages the tube 50 and can slide upwards and downwards within the tube 50 when the actuation member 16 moves upwards and downwards.

The actuating elements 18 and 20 each generally have a curvilinear body with posts 54 and 56, and posts 58 and 60, respectively. The posts 54 and 58 are L-shaped and the posts 56 and 60 have angled protrusions 62 and 64. The angled protrusions 62 and 64 interact with the locking mechanism to release the locking mechanism when the user actuates the corresponding actuating element 18 and 20. The two posts 54 and 56 define a channel 66 therebetween, and the two posts 58 and 60 define a channel 68 therebetween.

The input device 10 also includes a structural member 70, which is generally H-shaped. The structural member 70 aids in generally holding the actuation members 18 and 20 in place and properly guiding the movement of the actuation members 18 and 20 when they are actuated. The structural member 70 includes two L-shaped posts 72 and 74 and two rectangular posts 76 and 78. The structural member 70 also includes an aperture 80 that is sized to engage the tube 50 to form a friction fit. The L-shaped posts 72 and 74 are shaped in a complementary fashion with respect to the L-shaped posts 54 and 58 of the actuation members 18 and 20. However, the L-shaped posts 72 and 74 of the structural member 66 are sized to provide L-shaped channels 82 and 84 that are larger than the L-shaped posts 54 and 58 so that the L-shaped posts 54 and 58 can slide with respect to the structural member 70 when the user actuates either of the actuation members 18 and 20.

The posts 76 and 78 are sized to be a bit smaller than the channels 66 and 68 which also helps the actuation members 18 and 20 move in a certain direction with respect to the structural member 70 when the user actuates either of the actuation members 18 and 20. The length of the posts 76 and 78 are sized to be shorter than the lengths of the channels 66 and 68 so that springs 86 and 88 can be located within the channels 66 and 68 beside the posts 76 and 78. Accordingly, the actuation members 18 and 20 are spring-biased so that when the user presses either of the actuation members 18 and 20 and then lets go, the actuation members 18 and 20 move back to their original position. Furthermore, due to the spring-biasing, the user must use a certain amount of force to actuate either of the actuation members 18 and 20.

The locking mechanism of the input device 10 includes a first locking member 90, a second locking member 92 and a spring 94. The first locking member 90 includes two posts 96 and 98 defining a channel 100 therebetween that accommodates the width of the spring 94 and the width of the second locking member 92. The second locking member 92 has a generally rectangular body that can slide within the channel 100 of the first locking member. The second locking member also includes a protrusion 100 that can slide within the slot 52 of the tube 50 to engage either part of the narrow portion 36 of the peg 34 that is exposed at the gap g or a part of the wider portion 38 of the peg 34. The second locking member 92 further includes upper and lower circular tabs 102 and 104 on either surface the protrusion 100. The second locking member 92 is biased by the spring 94 so that the protrusion 100 either slides within the slot 52 to engage a part of the narrow portion 36 or the wide portion 38 of the peg 34. The protrusion 100 also includes an angled surface 106 that can be engaged by the shoulder portion s of the peg 34.

In use, when the input device 10 has the spherical form factor, the protrusion 100 will be engaging a part of the wide portion 38 of the peg 34. When the user decides to change the form factor of the input device 10 to the truncated sphere, the user will actuate at least one of the actuation members 18 and 20. The corresponding angled protrusion 62 or 64 will then move inwards and engage the corresponding tab 104 or 102 to push the second locking member 92 away from the tube 50. Accordingly, the protrusion 100 will no longer be engaging a part of the wide portion 38 of the peg 34 so the locking mechanism is released and the form factor of the input device 10 transforms back to the truncated sphere form factor. The user then lets go of the actuation member 18 or 20 that was being pressed and the spring 94 pushes the second locking member 92 towards the tube 50 so that the protrusion 100 can slide within the slot 52 and engage a part of the narrow portion 36 of the peg 34 that is exposed by the gap g. The locking mechanism is now once again engaged to maintain the form factor of the input device 10 as the truncated sphere until the user actuates actuation member 18.

When the input device 10 has the truncated sphere form factor, the user can push down on the actuation member 16 to switch to the spherical form factor. As the user pushes down on the actuation member 16, the shoulder portion s of the peg 34 pushes against the surface 106 of the second locking member 92. This causes the second locking member 92 to move away from the tube 50. As the actuation member 16 moves downwards, the peg 34 along with the boss 30 and the second housing portion 14 moves downwards with respect to the first housing portion 12 such that the form factor of the input device 10 becomes a sphere. The spring 94 still biases the second locking member 92 towards the tube 50. Accordingly, when the user no longer presses down on the actuation member 16, the protrusion 100 engages a part of the wide portion 38 of the peg 34 so that the input device 10 holds its spherical form factor.

In general, the transformation assembly of the input device 10 includes components that move housing portions with respect to one another to provide different form factors for the input device 10. The transformation assembly also includes components that link with the actuation members that initiate the transformation when actuated by the user. Accordingly, the actuation members are coupled to the transformation assembly. For instance, for this exemplary implementation, the components of the transformation assembly generally includes elements 32, 34, 44, 46, 70, 86, 88, 90, 92, and 94 as well as their associated portions.

Referring now to FIGS. 2c and 2d, shown therein is a cross-sectional side view of the exemplary input device 10 when operating in the first input mode and the second input mode, respectively. As shown in these views, the input device 10 can include a 2D tracker 110, a 3D tracker 112, a printed circuit board 114, a first switch 116, a second switch 118 and a third switch 120. The trackers 110 and 112 are sensors that are coupled to the housing of the input device via the printed circuit board 114 in this exemplary implementation. It should be noted that the tracker 110 is optional as is described in further detail below. The first switch 116, when actuated, indicates that the input device 10 is transitioning to the second input mode and that the form factor of the input device 10 is changing to the spherical shape. The second and third switches 118 and 120, when actuated, indicate that the input device 10 is transitioning to the first input mode and that the form factor of the input device 10 is changing to the truncated spherical shape.

In some implementations, the 2D tracker 110 can be a stand-alone tracker that tracks the x and y movements of the input device 10 when operating in the first input mode. In some implementations, the 2D tracker 110 can be replaced by a 2D marker when the input device 10 is used in conjunction with a suitable input device such as a graphical input tablet, for example, that can provide input data on the x and y movements of the input device 10 when it is operating in the first input mode. Since input data corresponding to rotation data only, without translation, is provided in the second input mode, the 3D tracker 112 can be implemented by a 3D tracker that provides data for 3 DOF.

The printed circuit board 114 includes a plurality of conductive traces for receiving and routing signals from the electrical components in order to group the signals together to provide input data. In some implementations, the printed circuit board 114 can be connected to a cable having a data connector that can be connected to a corresponding data port on a host computer. The input data is routed along the printed circuit board 114 to the cable. In other implementations, the input device 10 can include a wireless device (not shown) that is connected to the printed circuit board 114. In these cases, the input data is routed to the wireless device, which wirelessly transmits the input data to the host computer.

In use, when the input device 10 is operating in the first input mode, none of the switches 116 are actuated. When the user transforms the form factor of the input device 10 to the spherical form factor to operate in the second input mode, the actuation member 16 slides downwards to engage and actuate the first switch 116. The first switch 116 then generates a signal to indicate that the input mode is now the second input mode (i.e. the rotational input mode). This signal can then be used to activate the 3D tracker 112 and de-activate the 2D tracker 110 (if the 2D tracker 110 was previously enabled). In this exemplary implementation, the first switch 116 can be actuated the whole time that the input device 10 is operating in the second input mode.

When the user transforms the form factor of the input device 10 to the truncated spherical form factor, the user presses one of the actuation members 18 and 20, which actuates one of the corresponding switches 118 and 120. The actuated switch 118 and 120 then generates a signal to indicate that the input mode is now the first input mode (i.e. the translational input mode). This signal can be used to activate the 2D tracker 110, if one is used. Further, when the form factor of the input device 10 transforms to the truncated spherical form factor, the actuation member 16 moves upwards and disengages the switch 116. This action can be used to disable the 3D tracker 112.

It should be noted that other implementations of the transformation assembly are possible and the transformation assembly shown in FIGS. 2a-2d provides one exemplary implementation. For instance, in some implementations only one actuation member can be used to transform the form factor of the housing to various different form factors.

Figure 2E:
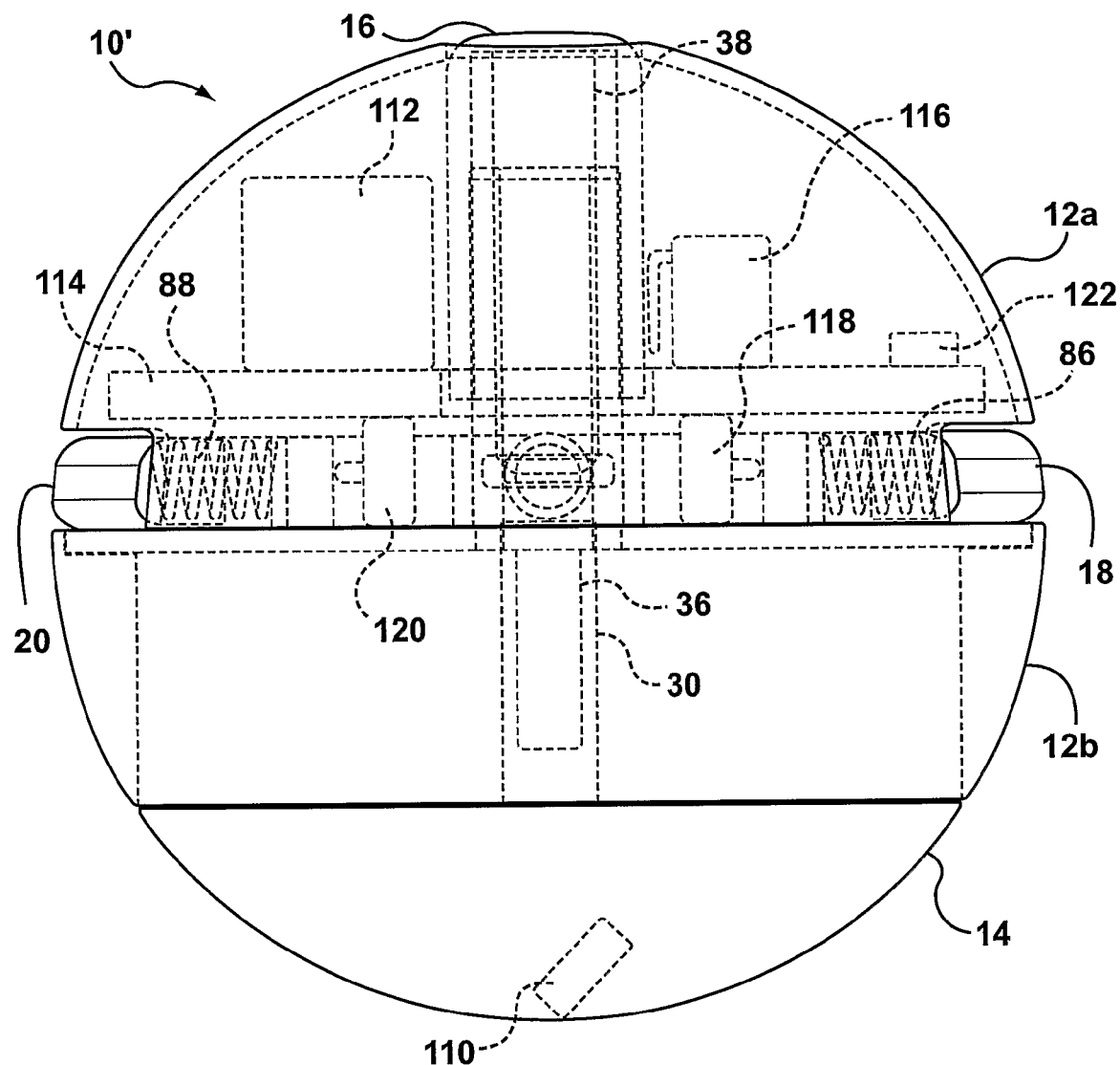
FIG. 2e is a cross-sectional side view of an exemplary implementation of an interface device.

Referring now to FIG. 2e, shown therein is a cross-sectional view of an exemplary implementation of an interface device 10' similar to input device 10 in structure and operation by having a haptics feedback module 122. One of the trackers 110 and 112 can be optional depending on the type of input data provided by the interface device 10'. The form factor of the interface device 10' is related to whether or not feedback is provided by the haptics feedback module 122. This functionality can be implemented in this case by associating the actuation member 16 with enabling or disabling the haptics feedback module 122. For instance, when the actuation member 16 is actuated, the switch 116 is triggered and the form factor changes to the spherical form factor. The switch 116 provides an indication of the form factor of the interface device 10' to the haptics feedback module 122. This signal can be used to enable/disable the haptics feedback module 122 depending on the form factor of the interface device 10'. Accordingly, in this exemplary implementation, when the interface device 10' has a spherical form factor, the switch 116 is on and the haptics feedback module 122 can be enabled. When the interface device 10' has a truncated spherical form factor, the switch 116 is off and the haptics feedback module 122 is disabled. Accordingly, the interface device 10' can have different form factors associated with different feedback status (i.e. on versus off).

Figure 3A:
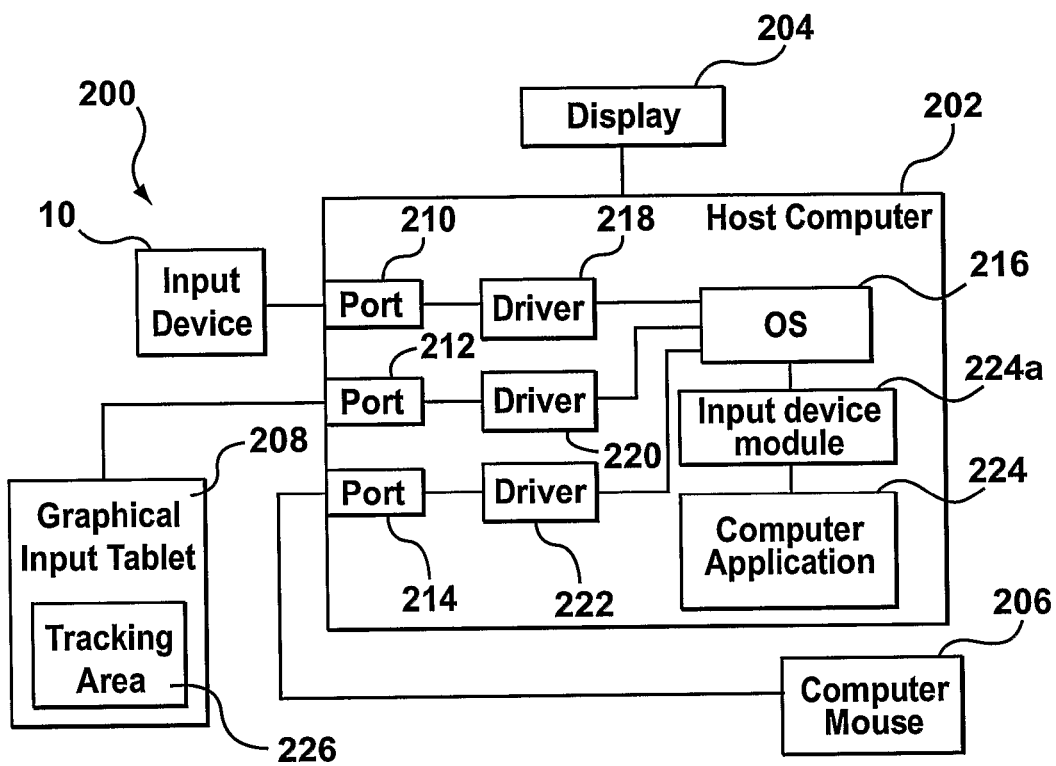
FIG. 3a is a block diagram of an exemplary system having a computer application with which the input device of FIGS. 1a-1b can be used.

Referring now to FIG. 3a, shown therein is a block diagram of an exemplary system 200 that incorporates the exemplary input device 10. The system 200 includes a host computer 202, a display 204, a computer mouse 206, a graphical input tablet 208, and the input device 10. The host computer 202 includes several ports 210-214 that the input device 10, the computer mouse 206 and the graphical input tablet 210, respectively, can interface with. The host computer 202 includes an operating system 216 for controlling the operation of the host computer 202 and running computer applications. The host computer 200 also includes several drivers 218-222 that allow the input devices 10, 206 and 208 to provide input data to a computer application 224 running on the host computer 200. The system 200 can also include an input device module 224a which can be considered to be a software plug-in module that can provide the computer application 224 with options that can be accessed by the user to control or configure the input device 10. In some cases, the computer application 224 can be a 3D computer modeling application. In other cases, the computer application 224 can be an educational program or a rehabilitation program, which are discussed in more detail below. The host computer 200 can further include other elements which are well known to those skilled in the art, such as a keyboard and the like. The display 204 can be a monitor, a large format projection screen, an immersive display, or a virtual reality display associated with a helmet, mask, glasses and the like. In some implementations, the display 204 is associated with a particular type of feedback provided to the user of the input device 10. For instance, the display 204 can be a haptic display, an auditory display (such as speakers), and the like.

In some implementations, the graphical input tablet 208 can be provided by a Wacom® graphical tablet. The graphical input tablet 208 includes a tracking area 226 that can be used to track the 2D translation of the input device 10 during the translational input mode when a user moves the input device 10 along the surface of the tracking area. Various sizes can be used for the tracking area 226 such as 18 inches by 12 inches, for example, To accomplish the 2D tracking, components of a Wacom® stylus can be embedded into the input device 10, such as, for example, a magnetic coil that is similar to the magnetic coil that typically resides in the Wacom stylus, the position of which is tracked by the Wacom graphical tablet. The graphical input tablet 208 can track the movements of the input device 10 when the bottom of the input device 10 is within a certain distance of surface of the tracking area 226, such as 1 inch for example. In alternative implementations, the graphical input tablet 208 is not used and the input device 10 can include a 2D tracker based on suitable technology, such as optical sensors that are commonly used in desktop mice, to provide the 2D translation information.

The computer application 224 can be one of many 3D computer applications that allow a user to manipulate objects in 3D space. For instance, the computer application 224 can be the Solidworks® 3D modeling application. In other instances, the computer application 224 can be 3D Studio Max, AutoCAD, FormZ, Alias|Wavefront Studio Tools, Maya, Rhino, Bryce, etc. Other types of computer applications can also be used, as is described in more detail below.

The drivers 218 and 220 corresponding to the input device 10 and the graphical input tablet 208 can be written to specifically provide communication between these elements and the computer application 224. This allows input data provided by the input device 10 and optionally, the graphical input tablet 208, to be sent to the computer application 224. Input data from the graphical input tablet 226 is sent by the driver 220 to the computer application 224 which can then process the input data to provide certain functionality. For instance, when the computer application 224 is the Solidworks® application, the 2D translation data sent by the graphical input tablet 208 can be converted to view panning and zooming operations in the Solidworks® application. The input data from the input device 10 is sent by the driver 218 to the input device module 224a which then process the input data into a form that the computer application 224 can understand and use to provide certain functionality. For instance, input data provided by the input device 10 during the rotational input mode can be processed by the input module 224a such that the computer application 224 can use the processed data to control object rotation. For implementations in which the input device 10 uses a 2D tracker, the graphical input tablet 208 is not needed (i.e. is optional) and the input device 10 can provide both the 2D translational and 3D rotational data. Furthermore, the input device 10 can provide a mode signal to indicate the current input mode of operation (i.e. translational or rotational) as well as signals from the switches 116, 118 and 120 when these switches are actuated which can then be processed by the input device module 224a to provide further data to or access additional functionality in the computer application 224a.

Furthermore, the user can access options provided by the computer application 224 to configure the operation of the input device 10 and the graphical input tablet 226 via the drivers 210 and 214. Accordingly, the drivers 218 and 220 can also alter the behaviour of both the input device 10 and the input graphical tablet 208. For instance, the acceleration level on the pan/zoom control of the input device 10 can be fine-tuned to suit individual needs. Also, the driver 218 can be programmed to allow the user to rotate the virtual object around different centre points or axes.

Furthermore, there can be implementations of the system 200 in which an interface device that is configured as an input/output device is used that includes at least one feedback element for providing at least one type of modality feedback such as tactile, haptic, visual, sound, etc. In these cases, the input device module 224a can interpret activity or characteristics in the computer application 224, such as the movement of an object, the interaction of an object with its surroundings (such as in a game for example), events which impact the object in any way, or characteristics of the object, and provide at least one corresponding feedback signal to the feedback element(s) of the interface device to provide the user with a virtual experience associated with the input object or other activity during the execution of the computer application 224. Various implementations for an interface device configured as an input/output device are described in more detail below.

A very frequently performed task during 3D modeling in the above mentioned environment is to manage the orientation and position of a modeled object on the display 204, so that the object is presented in a view best for the required modeling tasks. The most common types of view manipulation are: view rotation, view panning, and zooming. In most 3D software applications, conventionally there are three separate tools, or software controls, that allows for these three types of view manipulation. With conventional input devices and no augmentations made to the 3D computer application, the user typically uses a regular desktop mouse in their dominant hand as a main pointer for modeling tasks. The user then uses the mouse to select an appropriate tool from the Graphical User Interface (GUI) of the 3D computer application. The tool can be selected by interacting with a drop down menu or by pressing a button on the GUI. The user then uses the computer mouse 206 to perform certain actions based on the current tool. The user then chooses the next appropriate tool, and so on and so forth. This can be quite cumbersome and tedious for the user with only a conventional pointing device. Some users may employ keyboard shortcuts to switch between tools or to actually perform view manipulations. However, there is a learning curve involved to memorize and master the keystrokes. Moreover, since the input from a keyboard is discreet, key presses do not offer the user continuous and direct manipulation of the modeled object's orientation. For example, the user might be able to rotate the modeled object with the "alt+left arrow" keystroke, but the modeled object will only rotate at increments of a few degrees upon key presses.

With the input device 10, the user can use one of their hands to select an input mode for the input device 10 and then manipulate the input device according to that input mode. This frees the user's other hand to do other tasks which can include manipulating the mouse 206 to provide further input data to the computer application 224. Further, due to the form factors of the input device 10, and the particular input data that is associated with each form factor, the user can use the input device 10 with their non-dominant hand. This allows the user to use their dominant hand for more fine manipulation of modeled objects within a 3D computer application. This also allows the user to keep the skills already developed using the conventional pointing device with their dominant hand.

Figure 3B:
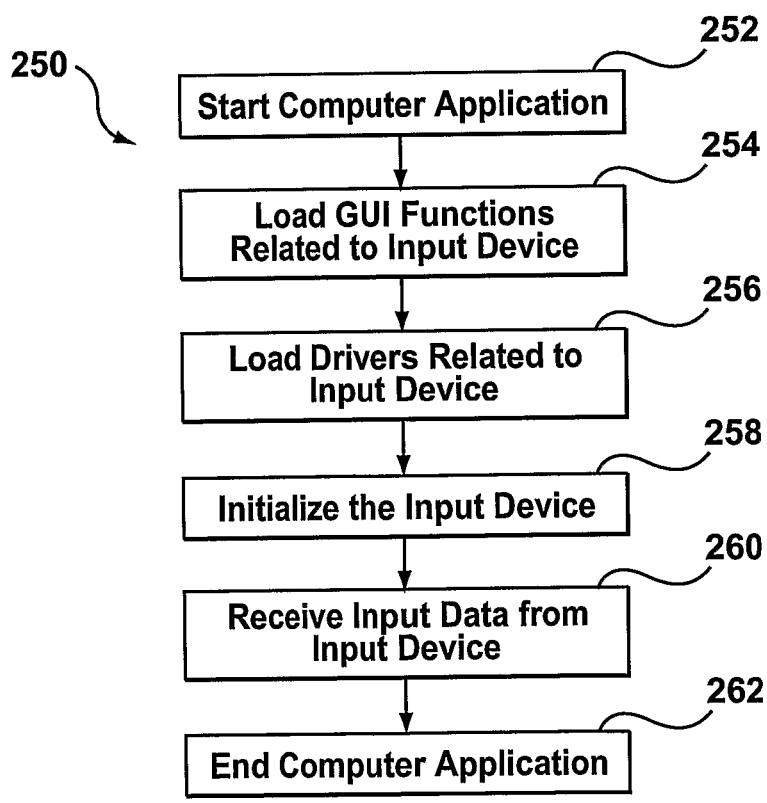
FIG. 3b is a flowchart diagram of an exemplary method of using the input device with a computer application.

Referring now to FIG. 3b, shown therein is a flowchart diagram of an exemplary method 250 for using the input device 10 with a computer application. The process 250 also applies for using any type of interface device, i.e. an input device, output device, or input/output device described with the characteristics herein, with a computer application or robotic device. At step 252, the user starts the computer application. At step 254, if applicable, GUI functions associated with the input device 10 are loaded. For instance, for a 3D computer application, a toolbar associated with the input device 10 can be loaded. In some implementations, the toolbar allows for the initiation of the driver associated with the input device. The toolbar can also provide the user with various options related to the input device, such as, for example, providing the user with an option for switching between 2D and 3D tracking independently of the transformation of the form factor of the input device 10.

At step 256, the drivers that are associated with the input device 10 are loaded. At step 258, the input device 10 is initialized so that it can start to provide input data to the computer application. At step 260, the computer application can receive input data from the input device 10. The input data can include translation data or rotation data depending on the input mode of the input device 10. This input data can also be combined with signals provided by the switches 116-120 when actuated by the corresponding actuation member 16-20 to provide further functionality in the computer application, as is described in further detail below. Step 260 continues as long as the user is using the computer application. Once the user chooses to end the computer application at step 262, input data from the input device 10 is no longer processed by the computer application and the computer application terminates.

With respect to a 3D computer modeling application, the input device 10 can be used as a position control device. In particular, the user can use the input device 10 to manipulate a 3D object by controlling the orientation, view panning and zooming of the 3D object with the non-dominant hand. This frees the dominant hand of the user to operate a conventional 2D pointing device such as a mouse or a stylus to perform more accurate tasks such as selection, translation, and fine rotation of the 3D object, for example.

Accordingly, the input device 10 allows the user to take advantage of the bimanual input technique, which has been shown by researchers to improve user performance and to better utilize the physical manipulation skills of the user. Bimanual input also results in increased time-motion efficiency, due to the timesharing of tasks between the two hands. Bimanual input techniques also introduce less mental workload to the user compared with single-handed input, because they take advantage of the user's everyday physical manipulation skills and the coordinated movements between the two hands.

Moreover, the form factor of the input device 10 transforms according to the input mode in such a way to best facilitate corresponding user tasks. For instance, the user can change the orientation of a 3D model using the rotational input mode of the input device 10. The user can perform view panning and zooming using the translational input mode of the input device 10. Accordingly, the input device 10 inherently separates providing rotation and translation input data, which still allows the user to make coordinated movements, yet avoids the situation in which the user is challenged by having too many degrees of control freedom. Moreover, due to the separation of input modes, the input device 10 does not require 6DOF position tracking. As a result, the input device 10 can operate using simpler and more cost effective orientation tracking technology, which helps to control the cost of the input device 10.

The form factor of the input device 10 influences the usability of the input device 10. The ideal form factor for rotation control is different from that for translation control. Accordingly, instead of a common form factor for providing both translation and rotation input data, the input device 10 transforms between two different form factors in the translational and rotational input modes in order to best facilitate user tasks in each mode.

Figures 3C, 3D:
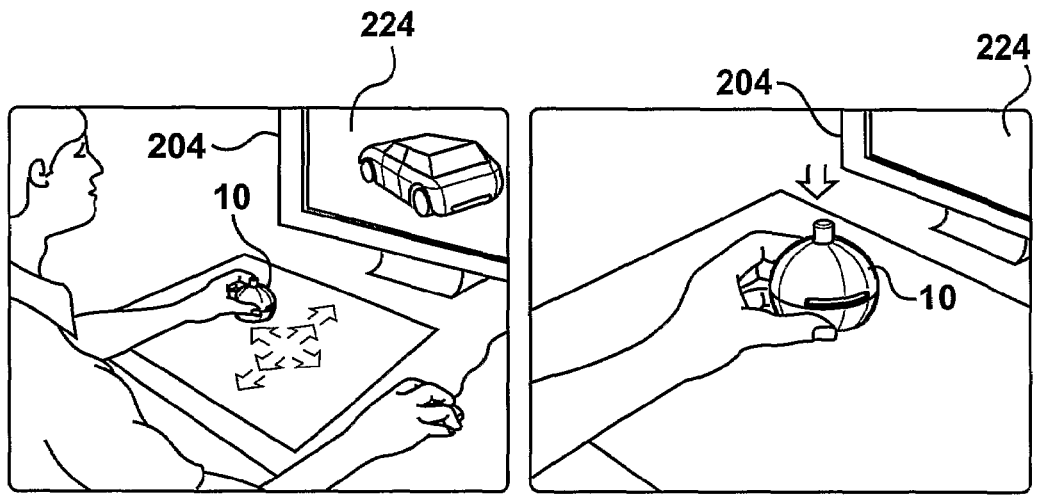

In the translational input mode, the form factor of the input device 10 allows it to rest on a tablet or a desktop surface. In this input mode, the input device 10 can map 2D translation movements onto 3D space as shown in FIG. 3c. View panning in the 3D modeling environment can be controlled by directly moving the input device 10 within 2D coordinates (i.e. along an X and Y axis). This is intuitive for the user because the desktop surface is directly mapped to the display surface. Further, the 2D position tracking can be "relative", which means that the input device 10 can be lifted off the surface and put back down at a different position without causing further panning of the modeling view. Only the displacement of the input device 10, while in close proximity to a desktop surface or a graphical input tablet, is translated into view panning.

Zooming, which can also be understood as translation along the Z axis, can be accomplished by pushing the input device 10 along the Y axis on a desktop 2D plane while holding a modifier key, or one of the actuator members 18 and 20. Alternatively, in some implementations, pressing the modifier key or one of the actuator members 18 and 20 can switch from panning to zooming while in the translational input mode. Alternatively, in some implementations, since input device 10 can be used in a bimanual device with an additional input device operated by the user's other hand, switching between panning and zooming can be done by holding or pressing a designated input element on the additional input device. The additional input device can be a keyboard, a mouse, a stylus pointing device and the like. Accordingly, the designated input element can be a key in the case of the keyboard, or a button in the case of the mouse or the stylus pointing device. In either of these cases, as the user moves the input device 10 away from themselves the modeling view zooms out, whereas as the user moves the input device 10 towards themselves the modeling view zooms in.

When the user actuates the actuator 16, two actions take place: 1) 3D orientation tracking is enabled, and 2) the form factor of the input device 10 switches to the spherical form factor). This action is shown in FIG. 3d. The input device 10 also sends a signal to the computer application 224 to indicate the change in input mode.

Figures 3E, 3F:
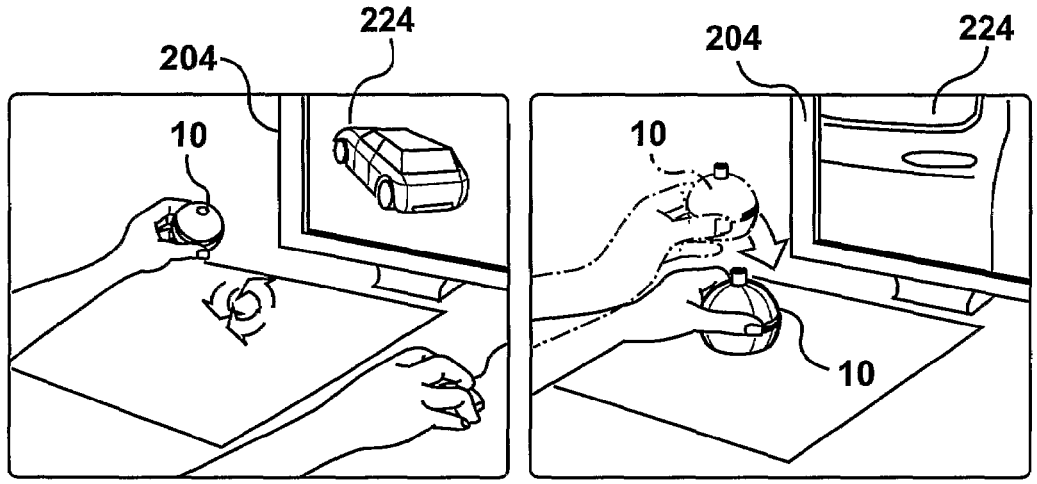

In the rotational input mode, the form factor of the input device 10 is spherical. The user can hold the input device 10 in his/her non-dominant hand and rotate it to control the orientation of a virtual model as shown in FIG. 3e. In some implementations, there can be a direct 1:1 mapping between the rotation of the input device 10 and the rotation of a virtual model that makes it very intuitive for the user to orient the model that appears on the display 204. This is a close kinesthetic representation of the way people actually manipulate physical objects in physical space. The user can also get a sense of the orientation of the input device 10 through proprioceptive feedback from the hand without having to provide direct visual attention to the input device 10.

Both of the actuation members 18 and 20 are active in the rotational input mode and in some implementations they can provide identical functionality. The redundant controls provide easy access to functions associated with the actuation members 18 and 20 while the user is holding the input device 10 in either hand, or in different positions. In some implementations, pushing either of the actuation members 18 and 20 with a thumb or finger can: 1) stop the 3D orientation tracking and "freeze" the current orientation of the virtual model on the display 204, and 2) transform the form factor of the input device 10 to coincide with the translational input mode (i.e. the truncated spherical form factor as shown in FIG. 3f). The actuation members 18 and 20 are associated with switching the input mode to the translational input mode, mainly because they are easier to access while the user is holding the input device 10 during the rotational input mode. In alternative implementations, the user can push the actuation member 16 again to switch from the rotational input mode to the translational input mode.

Figure 4A:
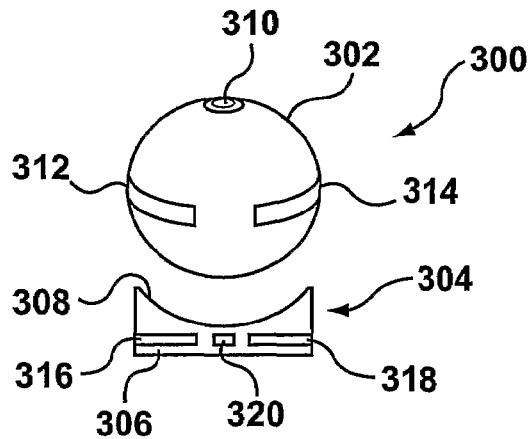
FIG. 4a is an illustration of another exemplary input device having different form factors for different input modes of operation.

Referring now to FIG. 4a, shown therein is an illustration of another exemplary input device 300 having different form factors for different input modes of operation. The input device 300 includes a first element 302 and a second element 304. The first element 302 has a spherical shape and the second element 304 has a lower disk-shaped portion 306 and an upper portion 308 that is shaped in a complimentary fashion with respect to the shape of the first element. In this exemplary implementation, the upper portion 308 has a bowl-shape. The first element 302 also includes actuation members 310, 312 and 314 that can be realized as a top button and side buttons similar to the input device 10. The second element 304 also includes actuation members 316, 318 and 320 that can also be realized as side buttons and a push button in some cases. Alternatively, in other implementations, both the first and second elements 302 and 304 can other types of actuation members that they are easily accessible by the user.

The input device 10 includes a 3D tracker in the first element 302, and can include a 2D tracker in the second element 304. Alternatively, a 2D marker can be provided in the second element 304, and the second element 304 can be used with a graphical input tablet to provide 2D translational input data to a computer application. There can be wireless or wired versions of the input device 300 in a similar fashion as the input device 10.

The non-dominant hand of the user can operate one of the elements 302 and 304 or both of the elements 302 and 304 when the first element 302 is placed on top of the second element 304. This allows the user's dominant hand to use a 2D pointing device such as a mouse or a stylus.

The input device 300 can operate in a similar fashion as the input device 10. Accordingly, the user can use the input device 300 in a translational input mode and a rotational input mode. The input device 300 can also provide different form factors depending on the type of input data that the user wishes to provide to a computer application, since the user can use the first element 302 alone (i.e. spherical form factor), the second element 304 alone (i.e. a circular disk form factor) and both the first and second elements 302 and 304 together (i.e. a spherical-circular form factor; see FIGS. 4*b* and 4*c*)

Figures 4B, 4C:
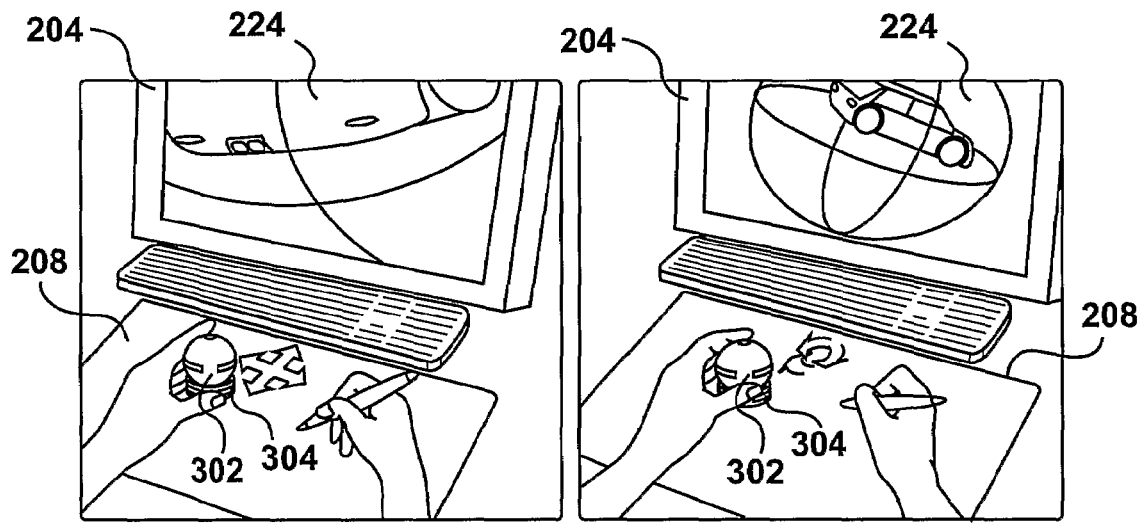

The user can place the first element 302 on top of the second element 304 and move the second element 304 in the X and Y direction to provide input translational data as shown in FIG. 4*b* so that the user can pan the view in a computer application. The view panning can be mapped relative to the translation of the second element 304. This mapping allows the user to reposition the second element 304 should the input device 300 reach the limit of the physical tracking surface before the panning is completed.

Also, by holding down one of the actuation members 316 and 318, and moving the second element 304 along the Y-axis, the user can provide zoom data in a similar fashion as the input device 10. Also, in this input mode, the user can actuate one of the actuation members 310, 312 and 314 to disable the first element 302 so that rotation input data is not provided by the input device 300 in case the user accidentally moves the first element 302 when moving the second element 304.

The user can rotate the first element 302 to provide 3D rotation data. This can be done while the first element 302 is sitting on top of the second element 304 (see FIG. 4*c*) or while the user is holding the first element 302 with the fingers of one hand (see FIG. 4*d*). For the configuration shown in FIG. 4*c*, the second element 304 can be disabled so that no translational input is provided if the user accidentally moves the second element 304. The user can disable the second element 304 by actuating the actuation member 320.

When the user is finished with the rotational input mode, the user can actuate one of the actuation members 310, 312 and 314 prior to placing the first element 302 on the second element 304 to disable the first element. This prevents additional rotational input from being triggered unintentionally from the path of the return movement in case the first element 302 moves when it is placed on the second element 304.

Figures 4D, 4E:
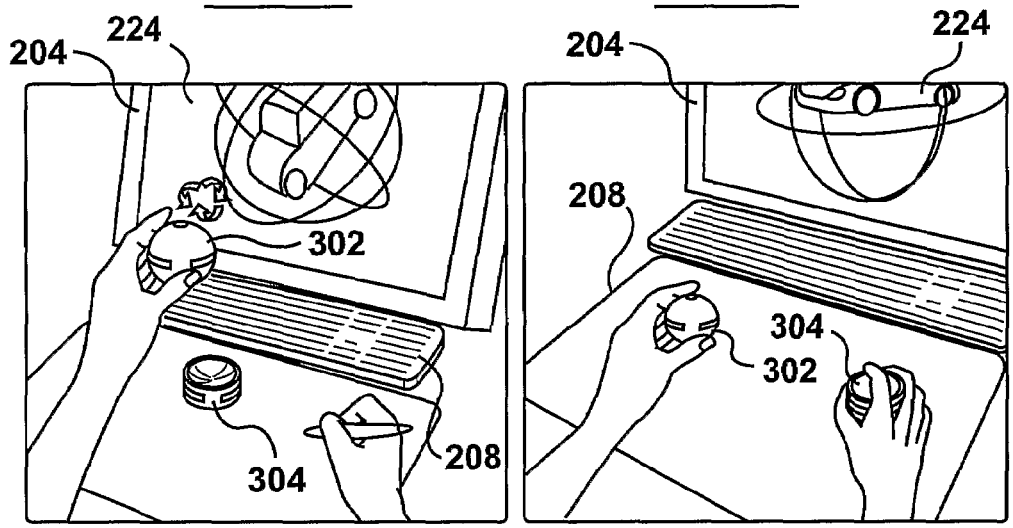

However, both input modes can also be used together to provide rotation and translation input data at the same time if so desired. The user can hold one of the elements 302 and 304 in one hand and the other of the elements 302 and 304 in the other hand as is shown in FIG. 4*e*. The functionality of this input mode can be enabled when the user actuates one of the actuation members 310, 312 and 314 as well as the actuation member 320. Alternatively, in some implementations, one of the actuation members can act as a toggle switch that can be used to select one of three operational input modes: rotational input mode, translational input mode and a combination of rotational and translational input mode. This information can be transmitted wirelessly from the first element 302 to the second element 304. In some implementations, feedback can also be provided so that the user knows the input mode of the input device 300. For instance, light sources (not shown) can be provided for the first and second elements 302 and 304. The light sources can emit light when the element that they correspond with is operational.

It should be noted that in some alternative implementations, the system 200 can be a robotic device that a user can interact with using various versions of the interface devices described herein. In this case, the host computer 202 can be a control unit with a processing unit and the necessary associated hardware, as is well known to those skilled in the art. The computer application 224 receives data from the interface device to control the operation of the robotic device. Further, the display 204 can be a monitor or a virtual reality display element that the user can use to view the environment of the robotic device and the interactions of the robotic device with the environment. Feedback elements can be included in the interface device to provide the user with sensory feedback on the activity of the robotic device and interaction with its environment. In robotic applications, the computer mouse 206 and/or the graphical may not be needed.

In various implementations of the input device, there can be a separation of various input/output functions via the transformation of the form factor from one shape to another shape. For instance, for the input device 10 a spherical form factor is associated with providing 3D rotation data, while a truncated sphere or sliced sphere form factor is associated with providing translation data that can be used to pan and zoom the view of an object in a computer application. However, other shapes for the form factors can also be used. For instance, the rotation input mode can be associated with an ovoid shape for the form factor and the translation input mode can be associated with a truncated or sliced ovoid. Other form factors that can be used for alternative input devices include, but are not limited to, cylindrical, pyramidal and conical shapes, which are discussed below and shown in FIGS. 5*a*-5*g*. Ellipsoidal shapes (not shown) can also be used. It should be understood that each of these alternative input devices generally operates in a similar fashion to the input device 10 and so the operation of the alternative input devices will not be discussed in detail. Further, the alternative input devices include a 3D orientation tracker and may include a 2D orientation tracker. Alternatively, the alternative input devices can include a 2D marker and can be used with a graphical input tablet to provide 2D input data. Input mode switching can automatically occur when the form factor of the alternative input devices is changed.

Figure 5A:
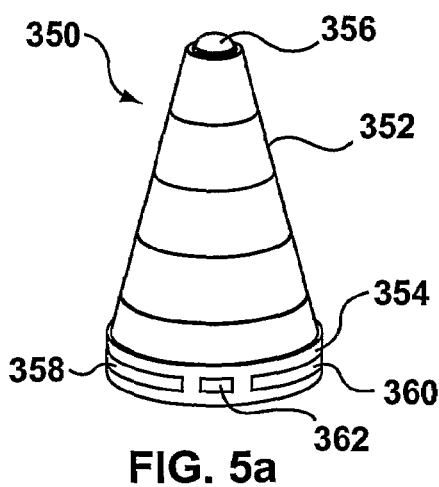
FIGS. 5a-5f are illustrations of other exemplary input devices having different form factors for different input modes of operation.
Figure 5B:
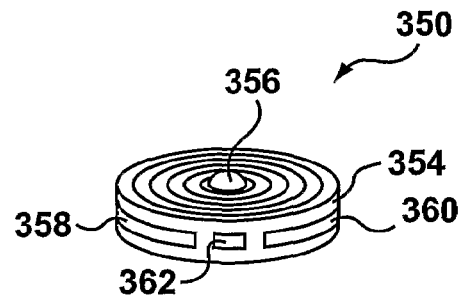

Referring now to FIGS. 5*a*-5*b*, shown therein is an input device 350 with conical and disc-shaped form factors, respectively. The conical form factor corresponds to the input rotational mode and the disc-shaped form factor corresponds to the translational input mode. The input device 350 includes an upper telescopic conical portion 352, a lower disc-shaped portion 354, and actuation members 356, 358, 360 and 362.

In the rotational input mode, the user can grasp the conical portion 352 with his/her fingers and rotate the input device 350 to provide rotational input data. When the user decides to change the form factor to the disc shape, the user can actuate the actuation member 356. The upper conical portion 352 then telescopically collapses so that the form factor of the input device 350 has a circular disc shape. A locking mechanism is then engaged so that the input device retains the circular disc-shaped form factor. In the translational input mode, the user can move the input device 350 along a flat surface or move the input device 350 along with an input graphical tablet to provide translational data, depending on the implementation of the input device 350. In the translational input mode, the user can also actuate either of actuation members 358 and 360 to be able to zoom in on objects that are displayed in a corresponding computer application with which the input device 350 is used. The input device 350 can include another actuation member 362 that, when actuated, releases the locking member to transform the form factor of the input device back to the conical shape.

Figure 5C:
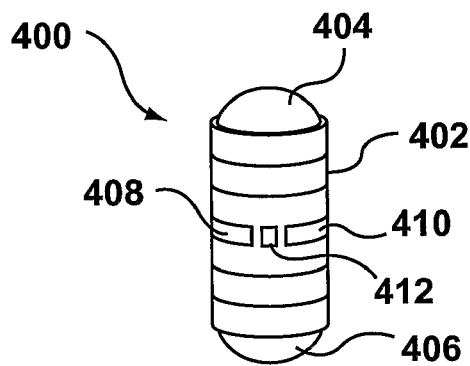
Figure 5D:
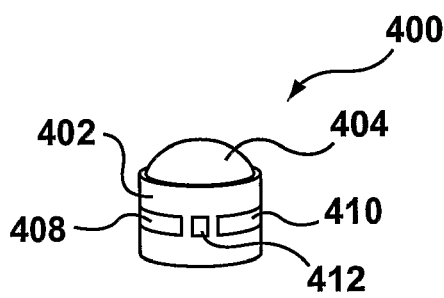

Referring now to FIGS. 5c-5d, shown therein is an input device 400 with cylindrical and disc-shaped form factors, respectively. In the rotational input mode, the input device has the cylindrical form factor while in the translational input mode, the input device 400 has the circular disc-shaped form factor. The input device 400 includes a telescopic cylindrical portion 402 and actuation members 404-412.

In the rotational input mode, the user grasps the telescopic cylindrical portion 402 of the input device 400 and can rotate the input device 400 by using their fingertips or rotating and bending their wrists. When the user wishes to switch to the translational input mode, the user can actuate either of actuation members 404 and 406. The telescopic cylindrical portion 402 of the input device 400 then telescopically retracts so that the form factor of the input device 400 is the circular disc. A locking mechanism is then engaged to hold the form factor as a circular disc.

In the translational input mode, the user can slide the input device 400 along a planar surface, or within a tracking area of a graphical input tablet, depending on the implementation of the input device 400, to provide translational input data to a corresponding computer application. The user can also actuate either one of buttons 408 and 410 to be able to zoom into an object that is shown in a computer application. This can be done by holding down either one of the actuation members 408 and 410 and moving the input device 400 along the y-axes.

When the user wishes to switch back to the cylindrical form factor, the user can actuate the actuation member 412, which releases the locking mechanism such that the cylindrical portion 402 telescopically expands into the form shown in FIG. 5c. Alternatively in some implementations, the user can actuate either one of the actuation members 404 and 406 to disengage the locking mechanism and change the form factor of the input device 400 to the cylindrical-shaped form factor.

Figure 5E:
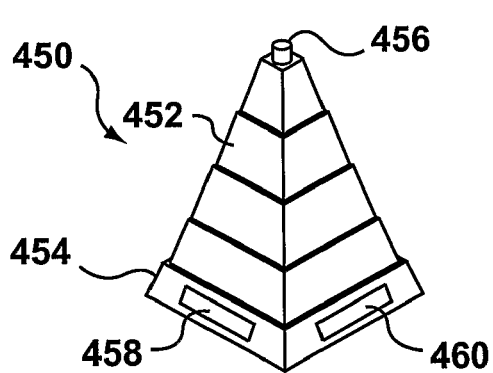
Figure 5F:
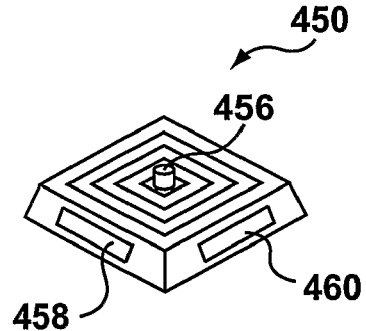

Referring now to FIGS. 5e-5f, shown therein is an input device 450 with pyramidal and rectangular shaped form factors, respectively. In the rotational input mode, the input device 450 has the pyramidal form factor, while in the translational input mode, the input device 450 has the rectangular form. The input device 450 includes a telescoping pyramidal portion 452 and a rectangular base portion 454. The input device 450 also includes the actuation members 456, 458 and 460. Other actuation members can be placed on the sides of the rectangular base portion 454 that are not visible in FIGS. 5e and 5f.

In the rotational input mode, the user can grasp the upper pyramidal portion 452 and rotate the input device 450 using the tips of his/her fingers or by rotating and bending his/her wrist. When the user wishes to transform to the translational input mode, the user can actuate the actuation member 456 such that the pyramidal portion 452 retracts downwards so that the input device 450 has a rectangular disc-shaped form factor. A locking mechanism is engaged so that the input device 450 retains this form factor. The user can then move the input device 450 along a flat surface or within the tracking area of a graphical input tablet, depending on the implementation of the input device 450, to provide translational input data to a computer application with which the input device 450 is used. The user can actuate either one of actuation members 458 and 460 to use a zoom function associated with the computer application.

In the translational input mode, the actuation member 456 can be used as a joystick. Accordingly, the user can use the input device 450 to play game applications.

The input device 450 can include another actuation member (not shown) along the edge of the rectangular disc portion 454 that can be used to release the locking mechanism when actuated so that the form factor of the input device 450 changes back to the pyramidal shape.

Figure 6A:
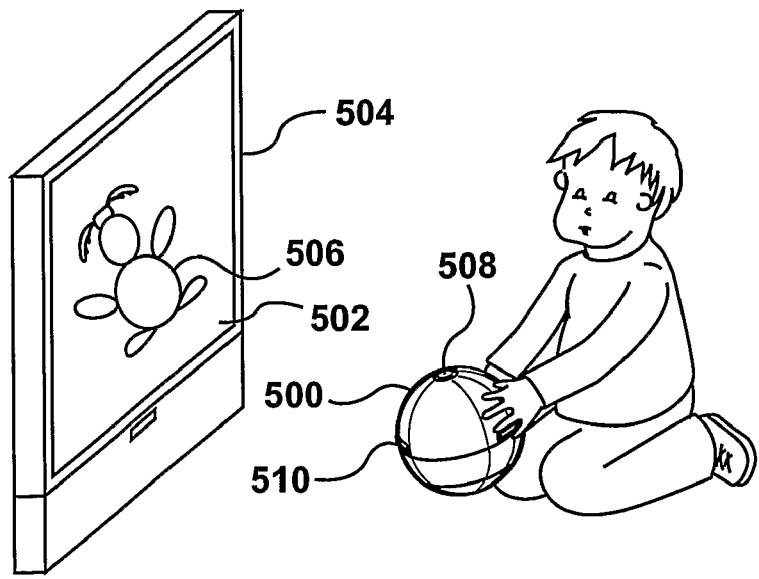
FIGS. 6a-6b are illustrations of various applications for which interface devices having a transformable form factor can be used; and, FIG. 7 is an exemplary block diagram of an interface device.
Figure 6B:
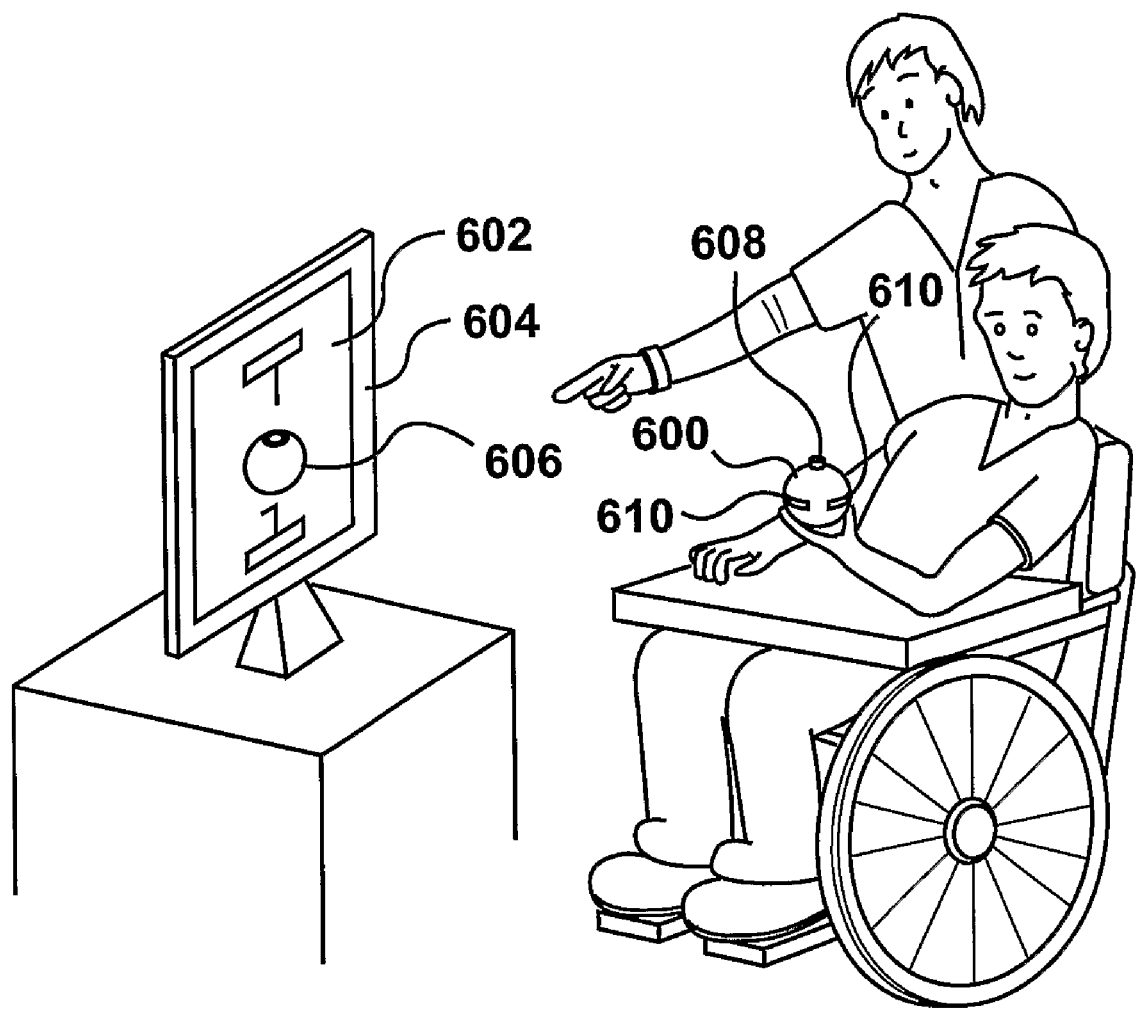

The interface devices described herein can be used in a variety of applications. The interface devices described herein can also have a variety of sizes and different form factors that can be selected based on the particular application. Referring now to FIGS. 6a-6b, shown therein are illustrations of two applications for interface devices each having transformable form factors. In FIG. 6a, a child is shown playing with an interface device 500 having different form factors. The child can use the interface device 500 to interact with an educational interactive computer application 502 that is displayed on a display screen 504. In this particular example, the child can use the interface device 500 to move an animal 506 around the display screen 502. The interface device 500 includes actuation members 508 and 510 for transforming the interface device 500 between the different form factors as well as providing additional input data to the computer application 502.

In this particular application, the size of the interface device 500 can be made large so that a child can easily handle the interface device 500. Further, the interface device 500 can also be made colorful to make it appealing so that the child will want to play with the interface device 500. The operational nature of the interface device 500 can also allow software applications to be structured to encourage the child to make large muscle movements (like when playing with a large playground ball).

In some implementations, the interface device 500 can include feedback elements (not shown) that provide haptic feedback, through force-feedback elements to provide vibration, or pulsing, or other suitable feedback elements, that can be used to reinforce and encourage the performance of the child. Haptic feedback provided through the input device 10 can aid in the development of spatial ability and eye-hand coordination. For example, a child playing with a virtual pegboard or shape orientation task could be provided with haptic feedback such that a vibration or pulse would be generated by the input device 10 (and in turn felt by the child) if the object being oriented collided with the surface of the virtual pegboard rather than slipping smoothly into the appropriately shaped hole.

Referring now to FIG. 6b, shown therein is a rehabilitation patient that is using an interface device 600 to interact with a computer application 602 shown on a display screen 604. The interface device 600 includes actuation members 608-612 to allow the user to transform the form factor of the input device 600 as well as to provide additional input data to the computer application. Since the interface device 600 is not hand dependent, the patient can use either or both hands with the interface device 600. Accordingly, the interface device 600 is suitable for use by stroke patients.

The functionality of the computer application 602 can be such that it requires the rehabilitation patient to manipulate an object 606 in the computer application 602 in certain ways. Patients can work on large muscle control and strengthening (by making an object 606 on the display 604 follow a particular path, for example) or fine muscle control and finger dexterity by rotating the object 606 to a particular orientation using the interface device 600. Incorporating haptic feedback (through vibrations or pulsing) could also be used to reinforce and encourage patient performance. In addition, the size of the interface device 600 can be selected based on the muscle groups or cognitive skills to be worked.

In some implementations, the interface device 600 can include feedback elements (not shown) that provide haptic feedback, through force-feedback elements to provide vibrations, pulsing, and the like, or other suitable feedback elements. The haptic feedback can be used to simulate the weight of an object being lifted or rotated as part of therapeutic exercises. For example, with stronger or more frequent haptic feedback, the patient needs to have a tighter grip on the interface device 600 that is otherwise needed to successfully control the interface device 600 thereby activating further muscle control and coordination in the patient.

The various interface devices described herein can be used in a variety of input configurations. For instance, the interface device can collaborate with other input devices to provide input data. For example, the form factor of the interface device can be switched to the second form factor, which generally has at least one flat surface, so that the interface device can be used with a graphical input tablet for determining panning and zooming locations. In this case the interface device can include a suitable 3D tracker, such as an inertial, accelerometer or magnetic-based tracker, to also provide 3D data. In some cases, the interface device can also include a joystick-like protrusion to allow the user to provide further input data to a computer application with which the interface device is used. In other cases, the interface device can include both 2D and 3D trackers and can be used as a stand-alone input device.

The various interface devices described herein can also be used in a variety of output configurations. For instance, the interface devices can provide a suitable form factor to pass information to other forms of technology such as a computer monitor to display the manipulation of 3D objects or with audio speakers to enhance audio cues related to object translation and rotation. The interface devices can also act as a stand-alone device by including all of the necessary output technology within the various form factors. For example, the interface devices can include haptic feedback, such as an audio, visual or vibrating means, for example, to alert the user of the collision of objects within the 3D virtual space of a computer application. In these cases, using the system 200 as an example, the input device module 224a provides feedback signals, based on the results of user interaction with the computer application, to the interface device that can then be transformed to haptic feedback by an appropriate haptic element of the input device. Alternatively, the interface device can include audio or visual cues to communicate that collaborative equipment, such as a 3D tracker, for example, is working.

It should be noted that in some alternative implementations, the interface device can have three or more form factors. Different functions can be associated with the different form factors. For example, for interface devices that have a telescopic conical or pyramidal portion, these portions can retract or extend to intermediate positions between the two positions shown in the figures. Further, different functionality could be associated with the extent to which these portions are extended/retracted.

Further, in some alternative implementations of the interface device, data is not provided for each form factor. For instance, in some implementations, the housing of the interface device can be transformable between a spherical form factor, in which the interface device provides rotation data, and a truncated spherical form factor in which the interface device does not provide any data. Rather, the truncated spherical form factor is used so that the user can put the interface device down on a flat surface after use and not worry that the device will roll off the surface, fall to the ground and become damaged, which can happen if the input device only had a spherical form factor.

One or more of the various features described herein can be included in an interface device with a housing having a transformable form factor based on data associated with the interface device. For instance, in some implementations, the interface device has a transformable form factor based on an input mode in which a type of movement data is provided by the interface device. Some implementations provide an interface device with a transformable form factor based on a feedback signal provided to the interface device in which the interface device provides a type of feedback modality output to the user of the interface device. In these implementations, the interface device includes a feedback module that includes one or more feedback devices for providing the feedback modality output. Some implementations provide an interface device with a transformable form factor based on at least one of: an input mode in which a type of movement data is provided by the interface device, and a feedback signal provided to the interface device in which the interface device provides a type of feedback modality output to the user of the interface device. In these implementations, the interface device can include at least one of: at least one sensor for providing the movement data, and a feedback module for providing the feedback modality output. The feedback signal can come from a computer application or a robotic device that a user is interacting with via the interface device.

Figure 7:
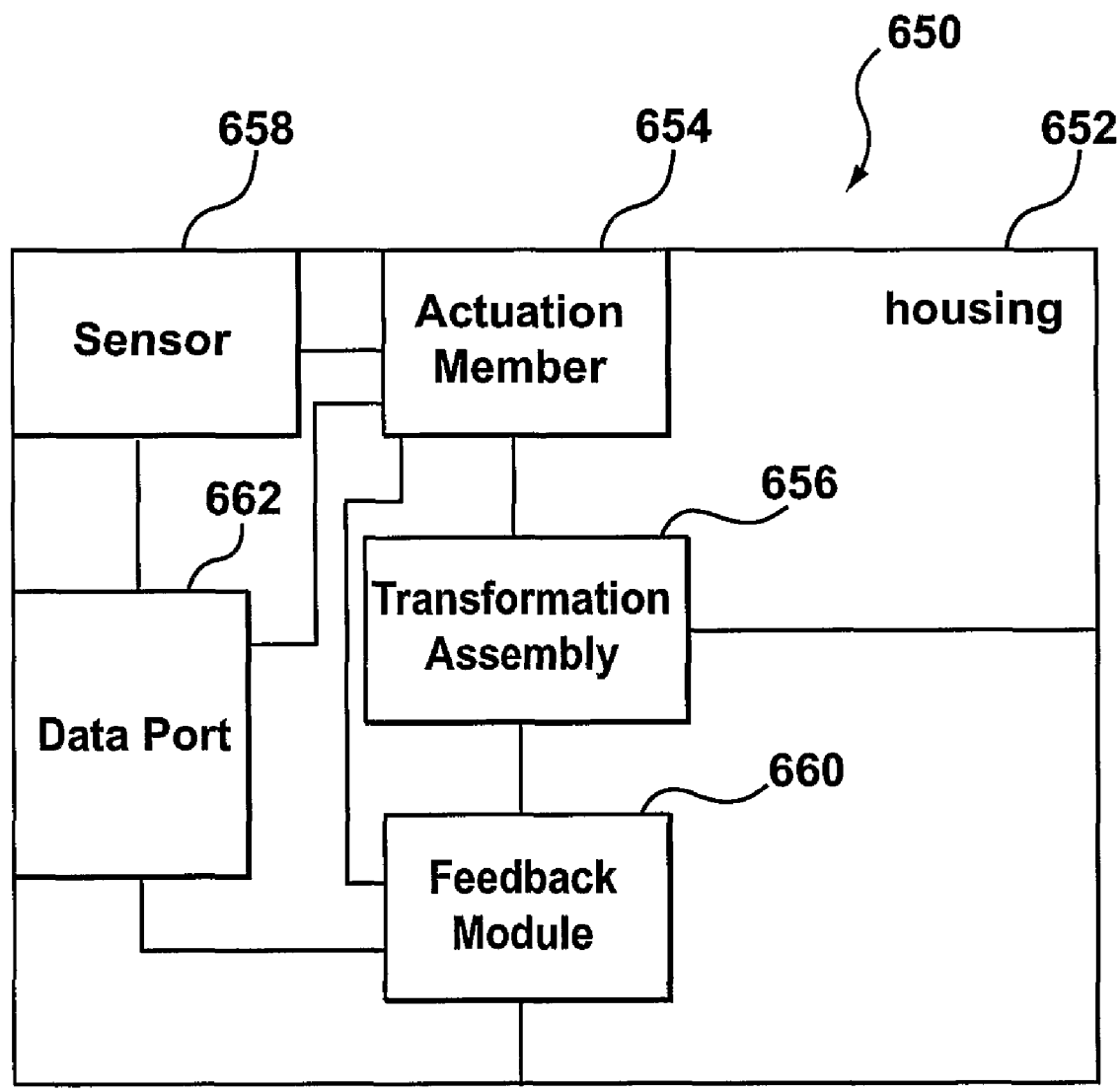

Referring now to FIG. 7, shown therein is a block diagram of an exemplary interface device 650. The interface device 650 includes a housing 652, an actuation member 654, a transformation assembly 656, a sensor 658, a feedback module 660 and a data port 662. Although not shown, the interface device 650 can include more than one sensor and more than one actuation member. The housing 652 includes apertures at the location the actuation member 654. The actuation member 654 is coupled to the transformation assembly 656. The actuation member 654 is also coupled to the data port 662 to optionally provide an output signal when actuated. The actuation member 654 can be associated with a switch (not shown) that provides the output signal. The output signal can be provided via a printed circuit board (not shown) to the data port 662. The sensor 658 can provide information on the movement of the interface device 650. Accordingly, the sensor 658 is coupled with the data port 662. The sensor 658 can also be coupled with the actuation member 654 so that the actuation member 654 can enable or disable the sensor unit 658 depending on the mode of operation of the interface device 650. The transformation assembly 656 is coupled to the housing 652 and the actuation member 654. The transformation assembly 656 can transform the form factor of the input device 650 when the actuation member 654 is actuated. There can also be wireless implementations in which the data port is replaced with a wireless communication unit.

The actuation member 660 and the transformation assembly 656 are coupled to the feedback module 660 to indicate the form factor of the input device 652 so that the feedback module 650 can provide an appropriate type of feedback to the user of the device 650. For instance, the feedback module 660 can include a variety of feedback devices that provide different output signals corresponding to the different senses (i.e. visual, auditory, tactile) of the user. For instance, the feedback module 650 can include at least two of a light source, a speaker, and a force-feedback device (all not shown) for providing a type of feedback for a given form factor of the input device 650.

However, the interface device 650 can also operate in another fashion. The interface device 650 can receive feedback signals via the data port 662 and provide these signals to the feedback module 660. The feedback signals can be generated by a computer program that the user interacts with via the input device 650. The computer program can be a three dimensional modeling program, a game, an educational program, a physical rehabilitation program, or a program used to control a robot. The feedback signals indicate that certain events have occurred in the operation of the computer program. The feedback signals can be used to provide feedback of a particular modality to the user to indicate that the event that has occurred. The feedback includes the activation of one of the feedback devices and a transformation in the form factor of the interface device 650. Accordingly, the feedback module 660 can instruct the transformation assembly 656 to transform the form factor of the input device 650 based on the modality of the feedback that is provided to the user. The transformation assembly 656 can include electro-mechanical actuation elements for acting on signals from the feedback module 660 to physically transform the housing 652 of the interface device 650. Accordingly, in operation, the interface device 650 has a first form factor associated with one mode of feedback or feedback modality (for example, a spherical form factor for haptic feedback to alert the user of collision detection in the operation of the computer program), and a second form factor associated with a different mode of feedback (for example, a truncated sphere along with an audio feedback sound to alert the user of collision detection in the operation of the computer program).

It should be understood that various modifications can be made to the devices, systems and methods described and illustrated herein, without departing from the teachings, the scope of which is defined in the appended claims.

The invention claimed is:

1. An interface device for allowing a user to interact with a computer application, wherein the interface device comprises:
   a) a housing having a transformable form factor;
   b) a transformation assembly coupled to the housing for transforming the form factor of the housing between more than one form factor, wherein at least one form factor of the housing has a shape corresponding to data associated with the interface device;
   c) at least one sensor coupled to the housing for providing movement data associated with the movement of the device; and
   d) at least one actuation member coupled to the transformation assembly for initiating the transformation of the form factor of the housing when actuated by a user;
   wherein the housing comprises first and second housing portions, and the transformation assembly is adapted to move the first and second housing, portions with respect to one another to transform the form factor of the housing; and
   wherein the first housing portion has a truncated sphere shape and the second housing portion has a bowl shape, and wherein the transformation assembly is adapted to move the second housing portion within the first housing portion to provide a truncated spherical form factor.

2. The interface device of claim 1, wherein the data associated with the interface device includes the movement data.

3. The interface device of claim 2, wherein the at least one form factor of the housing has a shape according to the type of movement data provided in an input mode.

4. The interface device of claim 3, wherein the at least one form factor of the housing includes a flat surface when the user moves the interface device along a flat surface to provide translational movement data.

5. The interface device of claim 3, wherein the at least one form factor of the housing includes a spherical surface when the user rotates the interface device to provide rotational movement data.

6. The interface device of claim 1, wherein the interface device further comprises a feedback module including at least two feedback elements, the at least two feedback elements being adapted to providing different feedback modality output signals to the user based on feedback data received by the interface device, wherein the data associated with the interface device includes the feedback data.

7. The interface device of claim 6, wherein the feedback module includes a light source for emitting light when the interface device is operating in a particular input mode.

8. The interface device of claim 6, wherein the feedback module includes a light source adapted to emit light when the interface device transitions between different input modes.

9. The interface mode device of claim 6, wherein the feedback module includes a light source adapted to provide the user with visual feedback to simulate interaction with a virtual object provided by the computer application.

10. The interface device of claim 6, wherein the feedback module includes a force-feedback element adapted to provide the user with tactile feedback to simulate interaction with a virtual object provided by the computer application.

11. The interface device of claim 6, wherein the feedback module includes a sound emitting device to provide the user with auditory feedback to emphasize an event occurring in the computer application.

12. The interface device of claim 1, wherein the interface device operates in first and second input modes, and wherein the housing has a corresponding first form factor when the interface device operates in the first input mode, and the housing has a corresponding second form factor when the interface device operates in the second input mode.

13. The interface device of claim 12, wherein the interface device provides a first type of movement data when operating in the first input mode and a second different type of movement data when operating in the second input mode.

14. The interface device of claim 12, wherein the interface device provides translational movement data in the first input mode and rotational movement data in the second input mode.

15. The interface device of claim 14, wherein the at least one sensor includes a three-dimensional tracker to track the rotation of the interface device to provide the rotational movement data.

16. The interface device of claim 15, wherein the interface device further comprises a two-dimensional tracker to track the translation of the interface device in relation to a flat surface to provide the translational movement data.

17. The interface device of claim 14, wherein the interface device is useable in combination with an additional input device to provide the translational movement data, the interface device further comprising a two-dimensional marker and the additional input device tracks the movement of the two dimensional marker to generate the translational movement data.

18. The interface device of claim 12, wherein the interface device is further adapted to automatically enable the at least one sensor that provides movement data associated with the corresponding input mode.

19. The interface device of claim 1, wherein when the user transforms the form factor of the housing, the interface device is adapted to automatically switch to a corresponding input mode.

20. The interface device of claim 1, wherein the interface device further provide additional types of data in addition to movement data.

21. The interface device of claim 1, wherein the at least one actuation member provides an output signal that can be used to provide additional functionality in the computer application.

22. The interface device of claim 1, wherein the at least one actuation member includes second and third actuation members located along the surface of the housing, and when either is actuated initiates a transformation to provide a truncated spherical form factor.

23. The interface device of claim 22, wherein the second and third actuation members are curved rectangular buttons having a concave outer surface.

24. The interface device of claim 1, wherein the first housing portion has a truncated sphere shape and the second housing portion has a bowl shape, and wherein the transformation assembly is adapted to move the second housing portion downwards with respect to the first housing portion to provide a spherical form factor.

25. The interface device of claim 24, wherein the at least one actuation member includes a first actuation member located at an upper portion of the housing having a rod-like shape, and when actuated initiates a transformation to the spherical form factor.

26. The interface device of claim 1, wherein the interface device further comprises:
   a) at least one switch associated with the at least one actuation member to generate at least one actuation signal when the at least one actuation member is actuated; and,
   b) a wireless unit connected to the at least one switch and the at least one sensor to receive the at least one actuation signal and the movement data, respectively, the wireless unit being adapted to wirelessly transmit wireless data based on the movement data and the at least one actuation signal.

27. The interface device of claim 1, wherein the interface device further comprises:
   a) at least one switch associated with the at least one actuation member to generate at least one actuation signal when the at least one actuation member is actuated; and,
   b) a connector port connected to the at least one switch and the at least one sensor to receive the at least one actuation signal and movement data, respectively, the connector port being adapted to connect to a corresponding port on a computing device to provide the movement data and the least one actuation signal.

* * * * *